United States Patent [19]

Higashiyama et al.

[11] Patent Number: 5,276,565
[45] Date of Patent: Jan. 4, 1994

[54] ROTARY TYPE MAGNETIC RECORDING AND REPRODUCTION APPARATUS

[75] Inventors: Yasushi Higashiyama, Yokohama; Takanori Furusawa, Tokyo, both of Japan

[73] Assignee: Kabushiki Kaisha Toshiba, Kawasaki, Japan

[21] Appl. No.: 525,831

[22] Filed: May 18, 1990

[30] Foreign Application Priority Data

May 23, 1989 [JP] Japan .................. 1-127906
May 23, 1989 [JP] Japan .................. 1-127911
Nov. 8, 1989 [JP] Japan .................. 1-288754

[51] Int. Cl.$^5$ .................. G11B 15/14; G11B 5/52
[52] U.S. Cl. .................. 360/64; 360/108
[58] Field of Search .................. 360/64, 108; 336/120

[56] References Cited

U.S. PATENT DOCUMENTS 3,911,486 10/1975 Hibbard .
4,213,084 7/1980 Hiromitsu .................. 336/120
4,614,985 9/1986 Tsuruta .................. 360/64
4,851,935 7/1989 Ohyama et al. .................. 360/64
4,926,273 5/1990 Tabuchi et al. .................. 360/108

FOREIGN PATENT DOCUMENTS 3715884 1/1987 Fed. Rep. of Germany .
1-106301 4/1989 Japan .
2173341 10/1986 United Kingdom .................. 360/64

OTHER PUBLICATIONS

Patent Abstracts of Japan, vol. 10, No. 111, (P-451) (2168), Apr. 25, 1986, & JP-A-60-242501, M. Hayashi, et al., "Rotary Head Cylinder", Dec. 2, 1985.
Patent Abstracts of Japan, vol. 13, No. 59, (P-826) (3407), Feb. 10, 1989, & JP-A-63-249902, H. Sekiguchi, et al., "Rotary Head Device", Oct. 17, 1988.
Patent Abstracts of Japan, vol. 7, No. 282, (P-243) (1427), Dec. 16, 1983, & JP-A-58-159203, A. Yoshioka, et al., "Magnetic Video Recording and Reproduction Device", Sep. 21, 1983.
Patent Abstracts of Japan, vol. 8, No. 194, (E-264) (1631), Sep. 6, 1984, & JP-A-59-084410, T. Inchi, et al., "Rotary Transformer", May 16, 1984.

Primary Examiner—Aristotelis Psitos
Assistant Examiner—Varsha V. Sheladia
Attorney, Agent, or Firm—Oblon, Spivak, McClelland, Maier & Neustadt

[57] ABSTRACT

A magnetic recording and reproduction apparatus includes a rotary drum to be driven to rotate, a first head provided on the rotary drum, a second head provided on the rotary drum so as to be set in an enable state when the first head is in a disable state, first and second amplifying circuits connected to the first and second heads, respectively, and capable of being set in an enable or disable state by a selection signal, a rotary transformer commonly coupled to the first and second amplifying circuits, and a selection signal generating portion for supplying a selection signal to the first and second amplifying circuits in synchronism with rotation of the rotary drum.

14 Claims, 23 Drawing Sheets

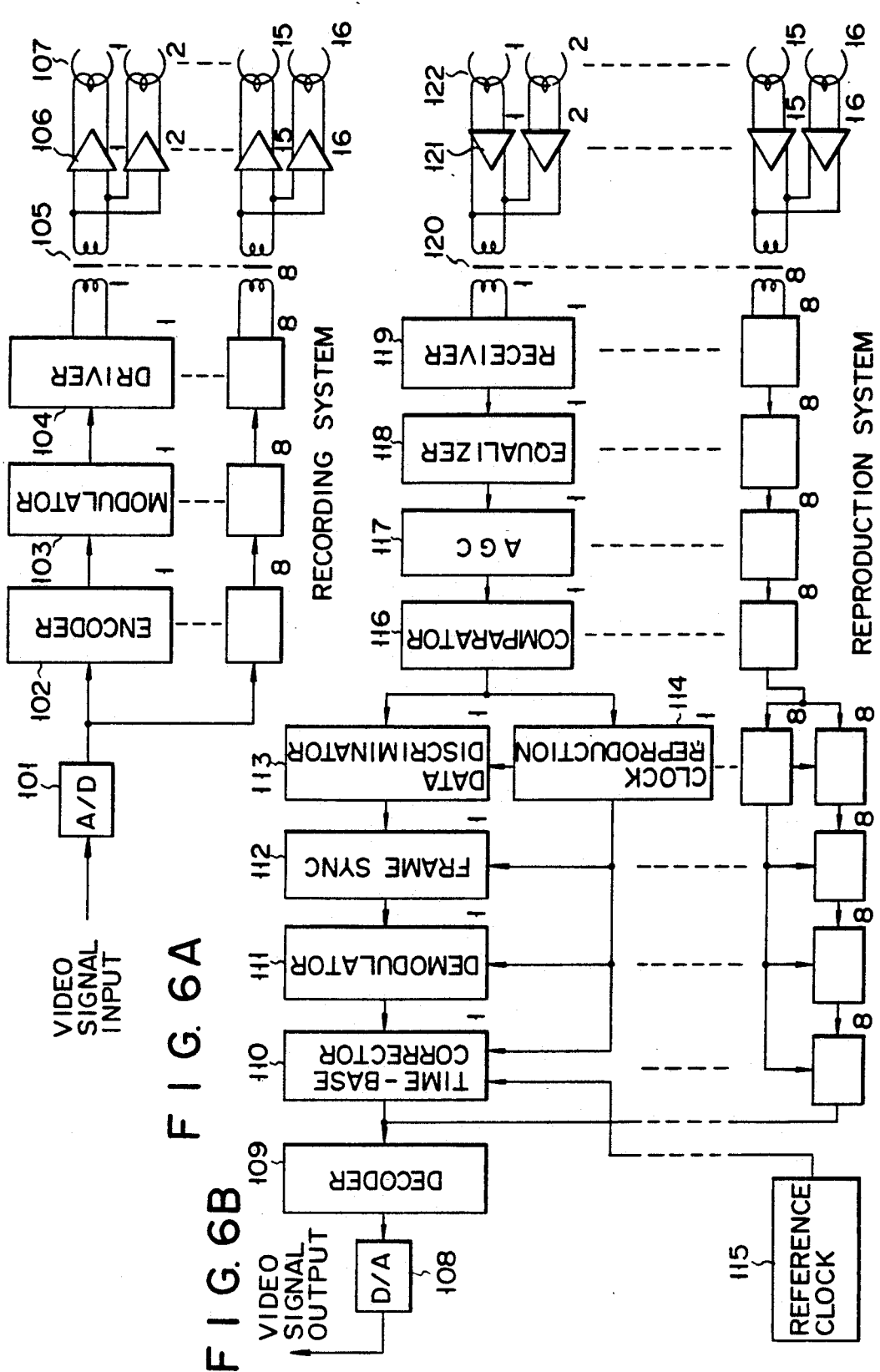

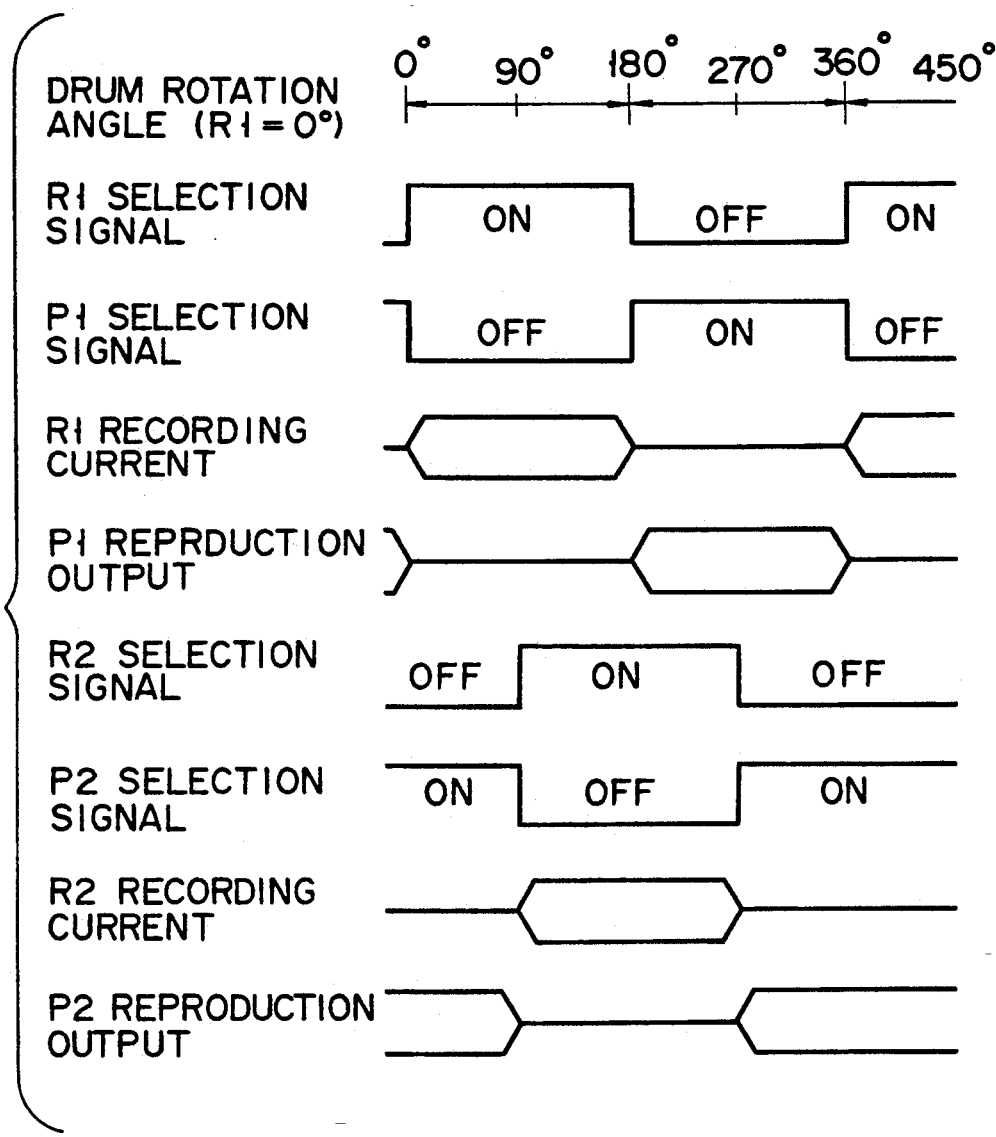
F I G. 10

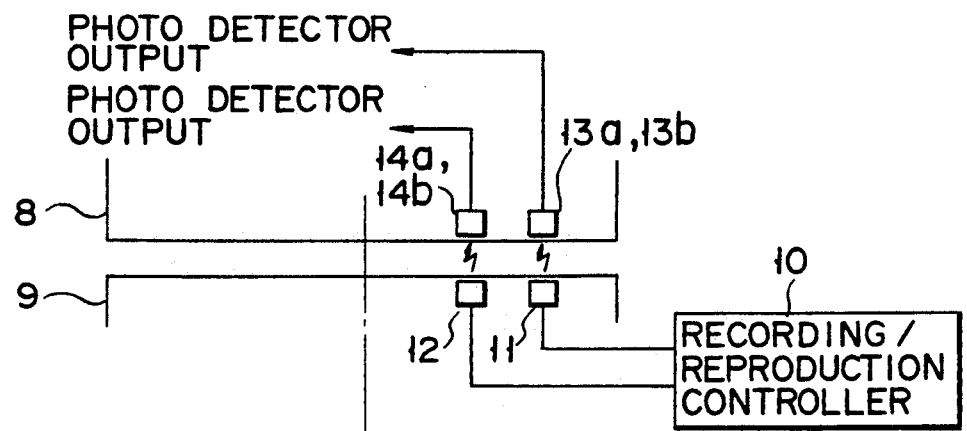
F I G. 11A
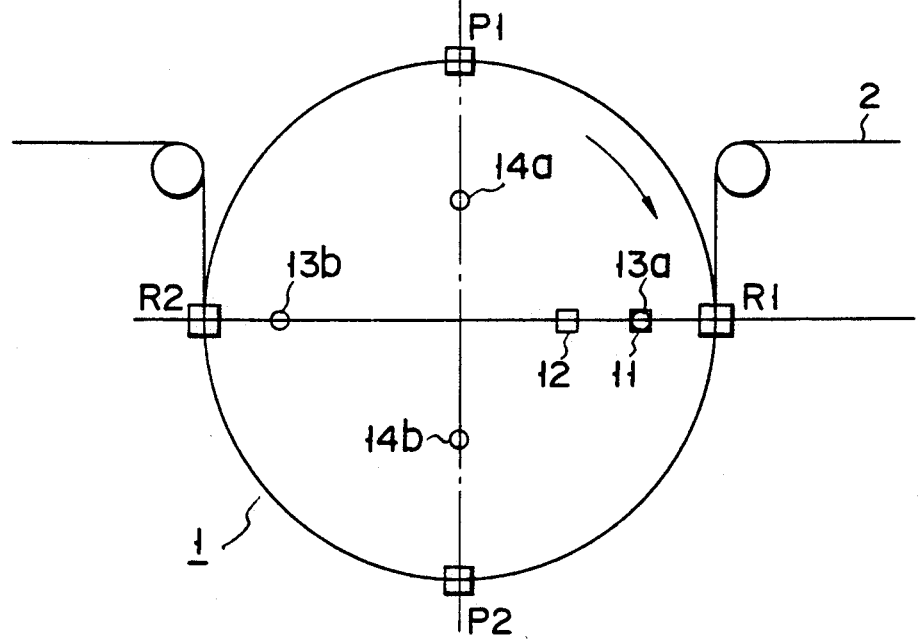
F I G. 11B

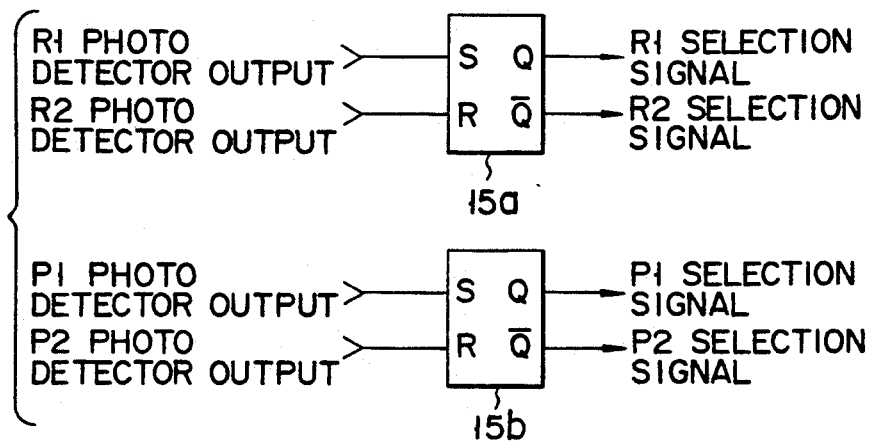
F I G. 12
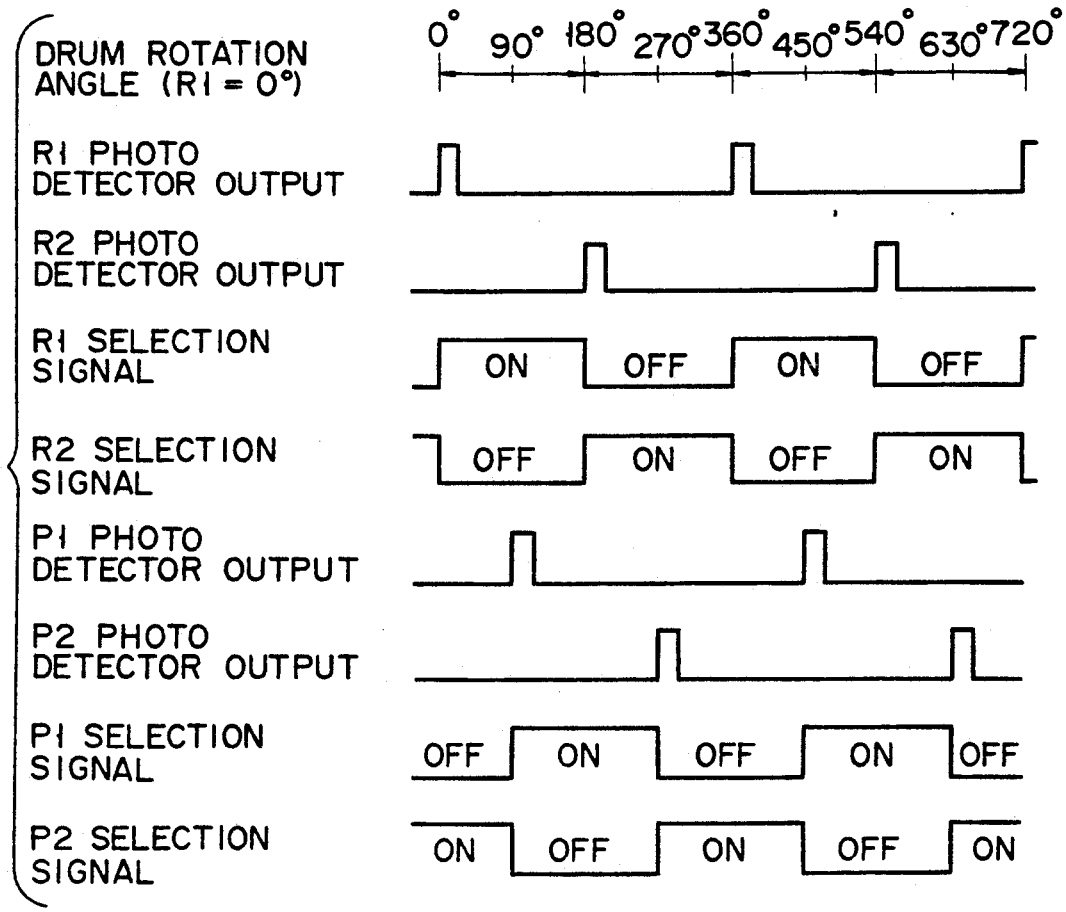
F I G. 13

F I G. 15
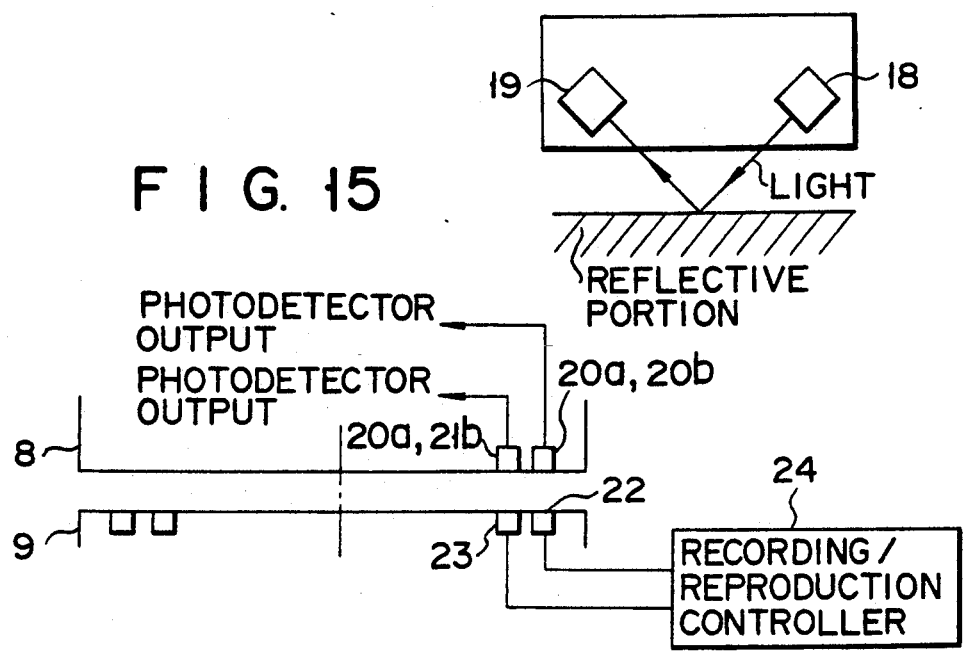
F I G. 16A
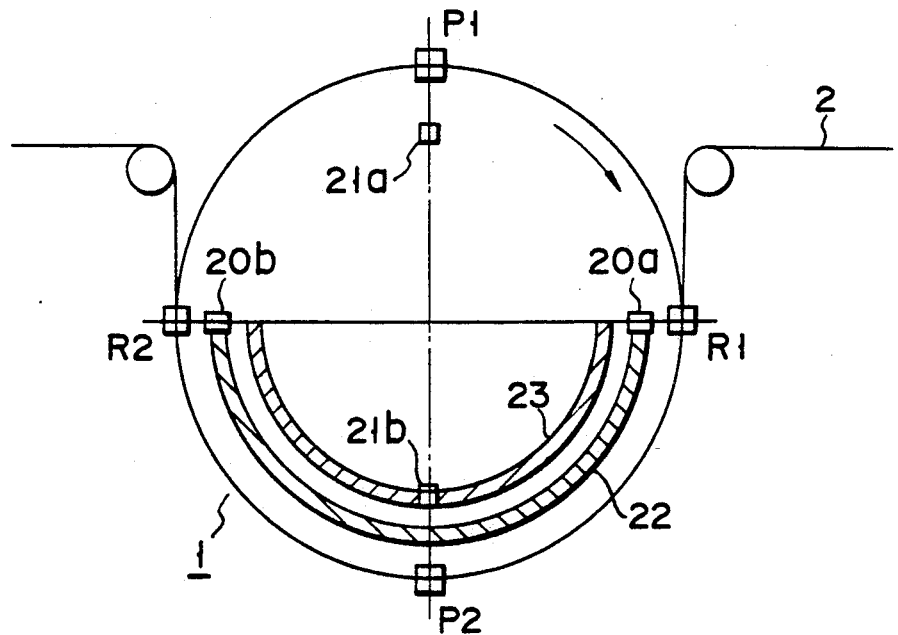
F I G. 16B

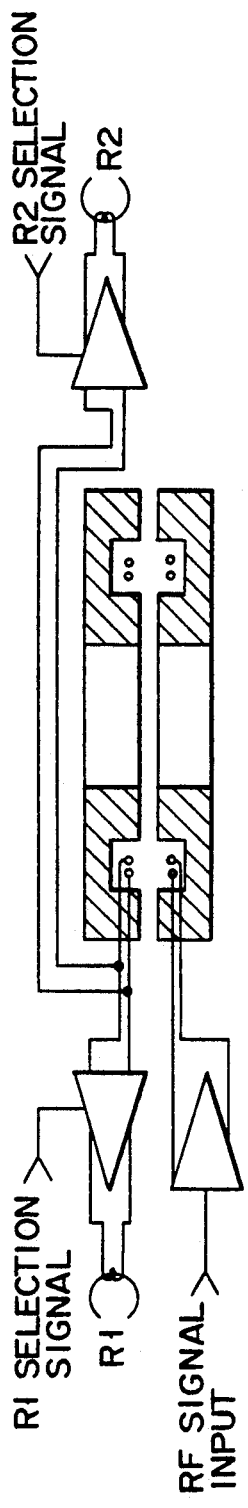
F I G. 17
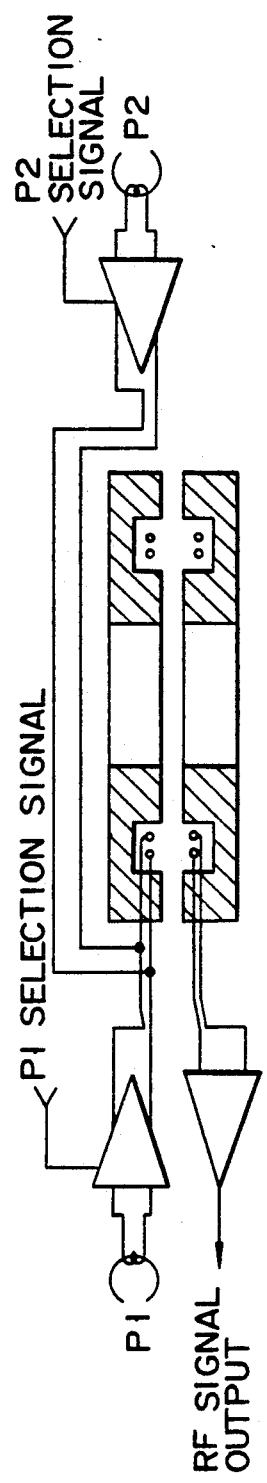
F I G. 18
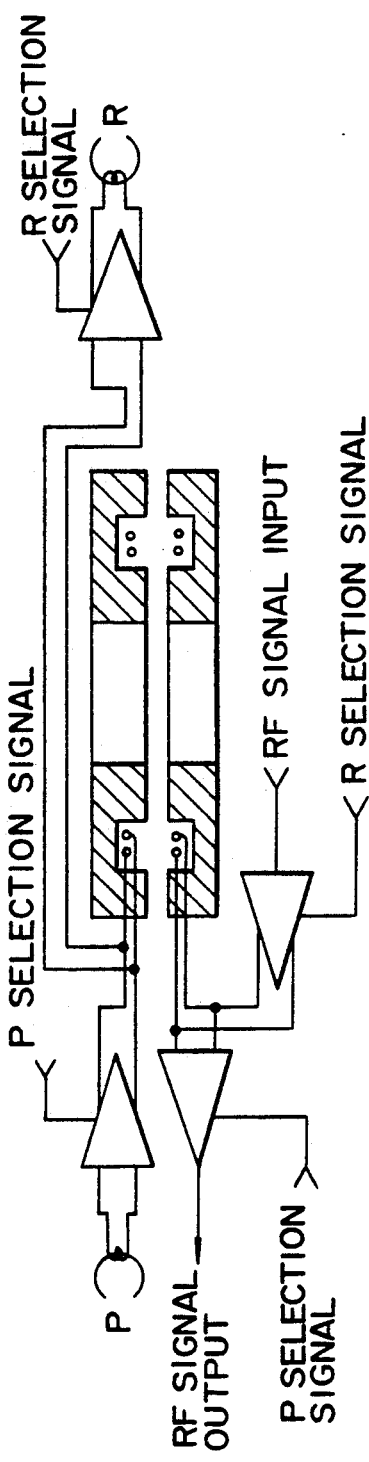
F I G. 19

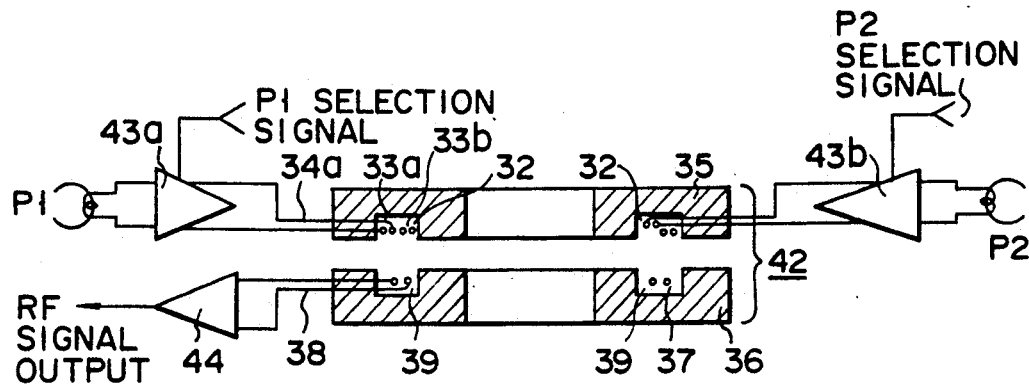
F I G. 23
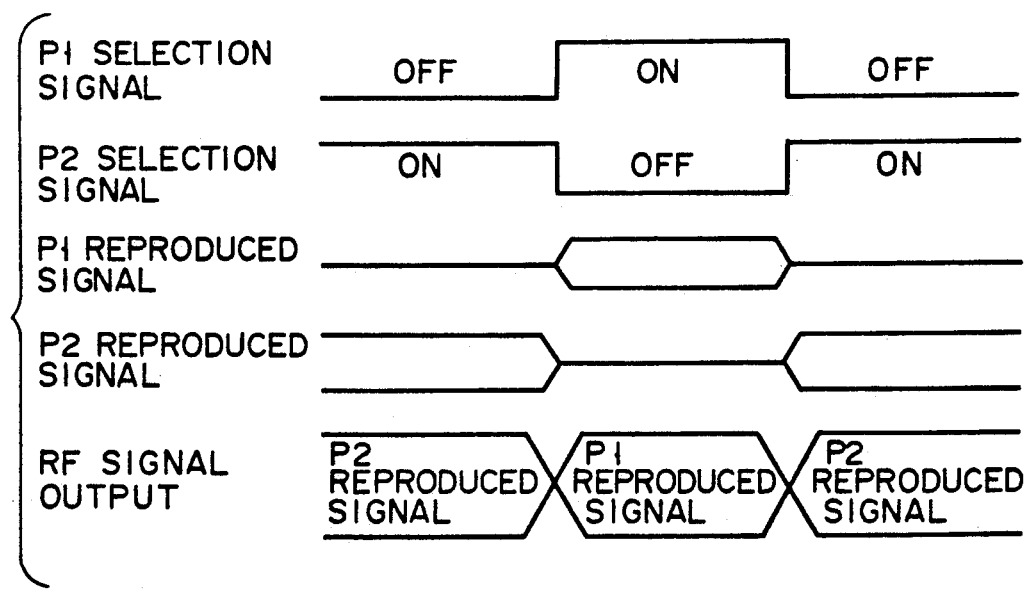
F I G. 24

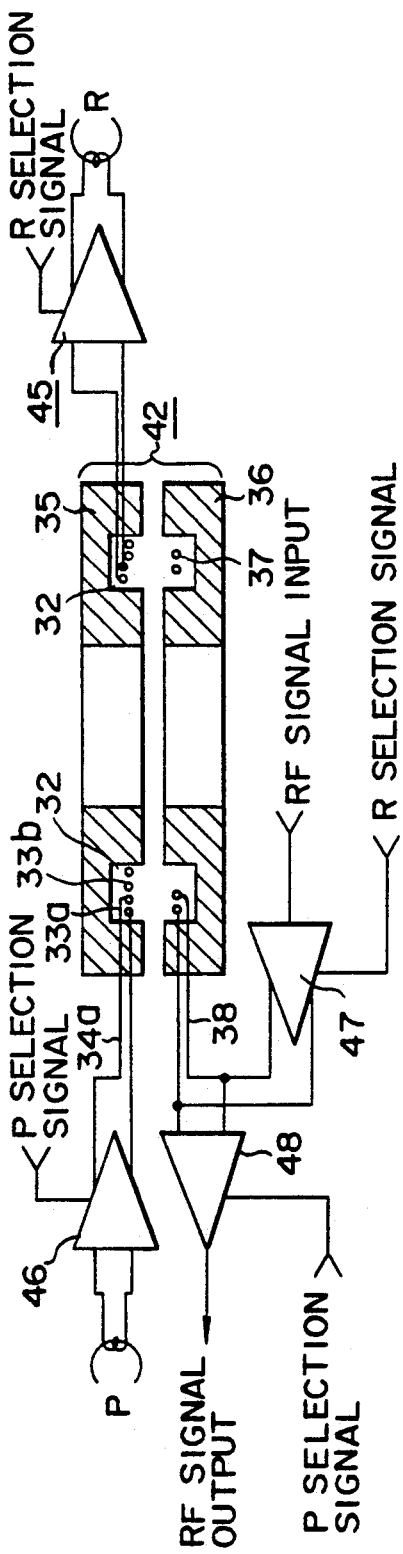
F I G. 25
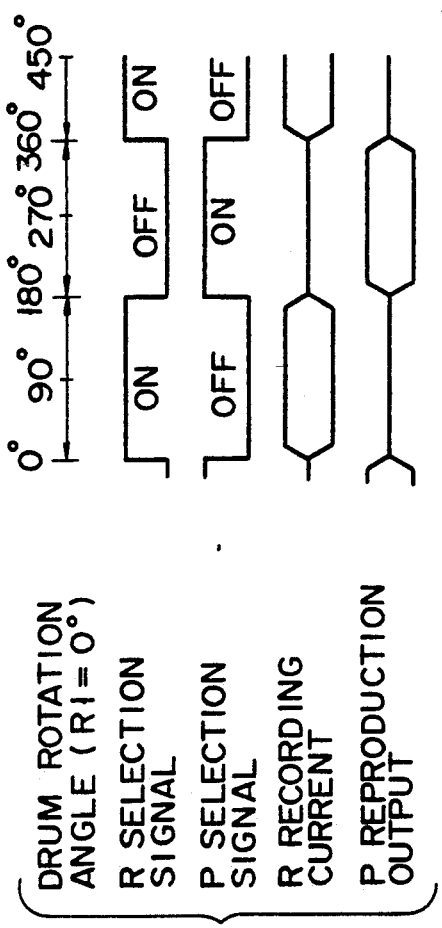
F I G. 26

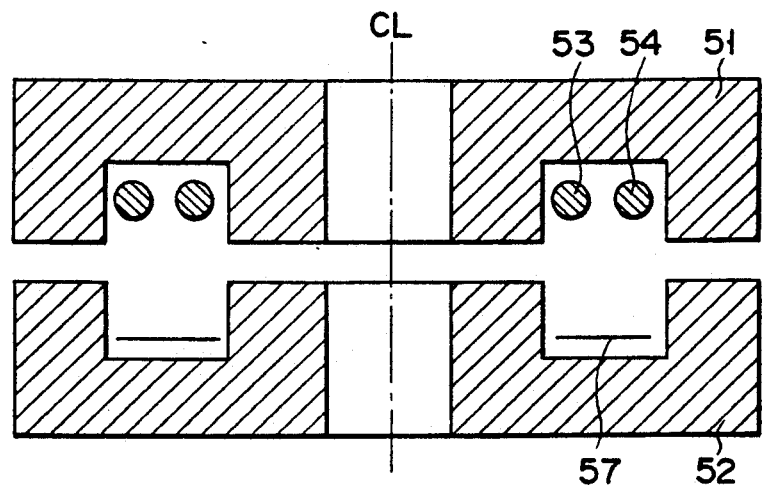
F I G. 30
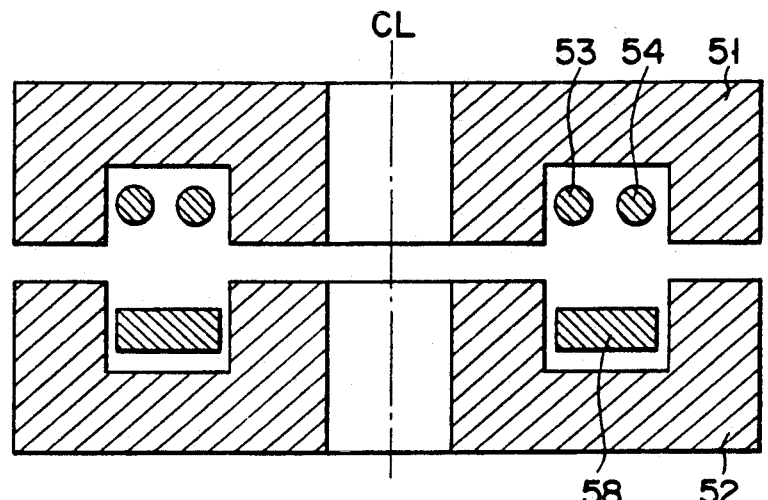
F I G. 31
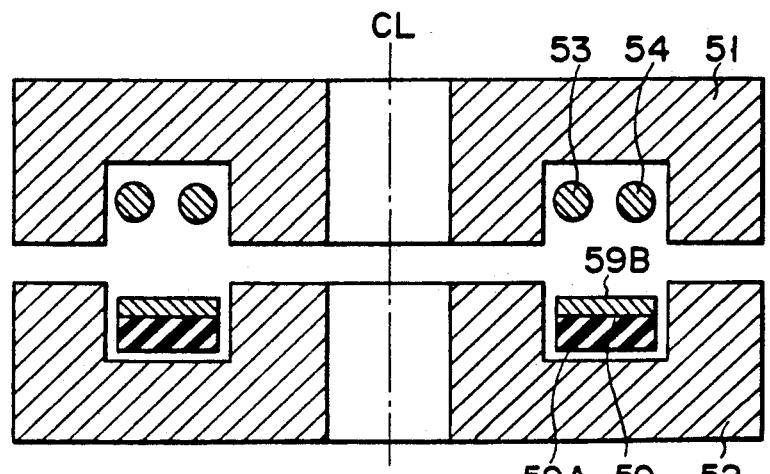
F I G. 32

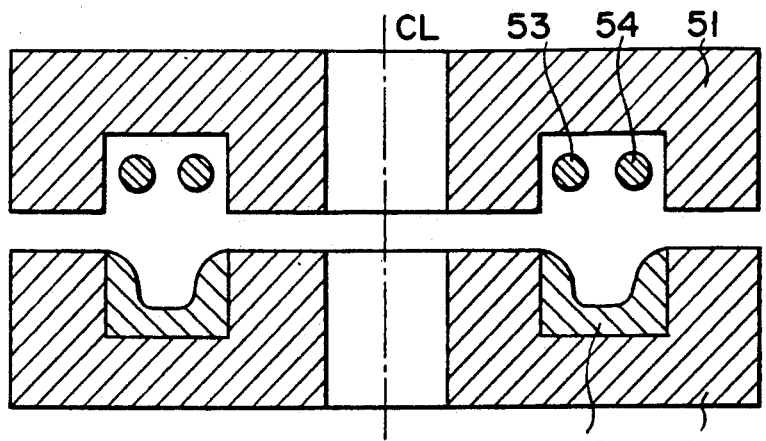
F I G. 33
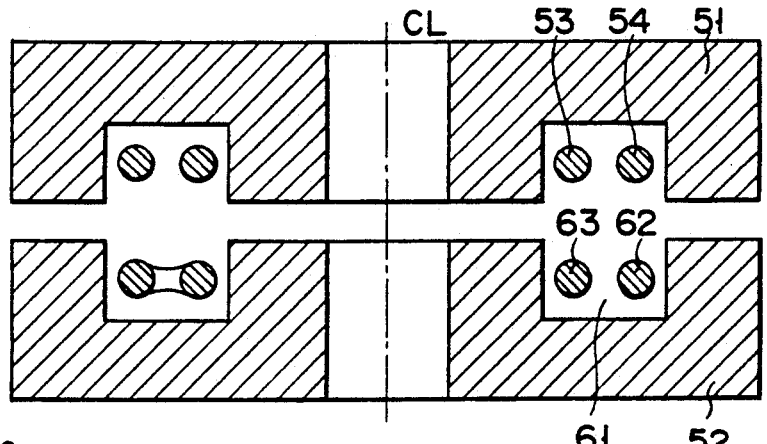
F I G. 34
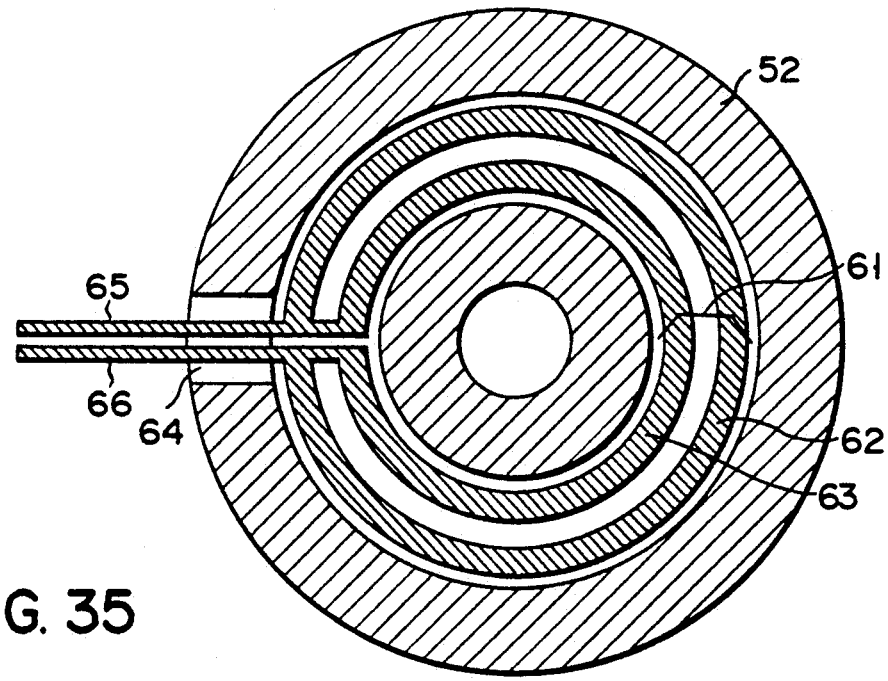
F I G. 35

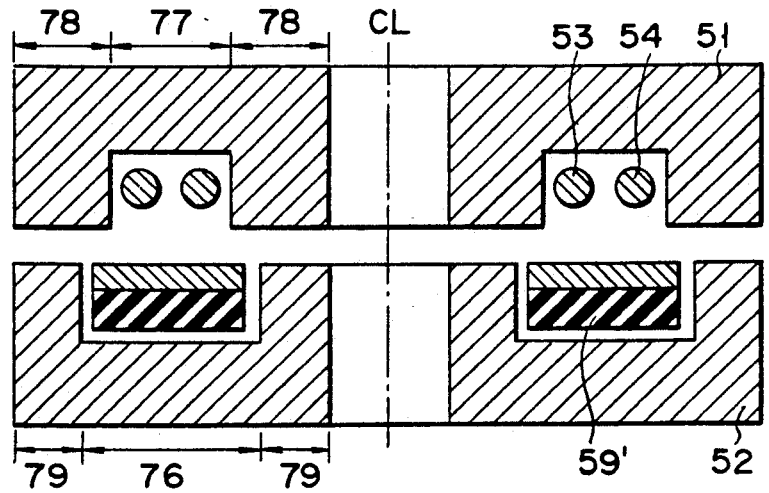
F I G. 42
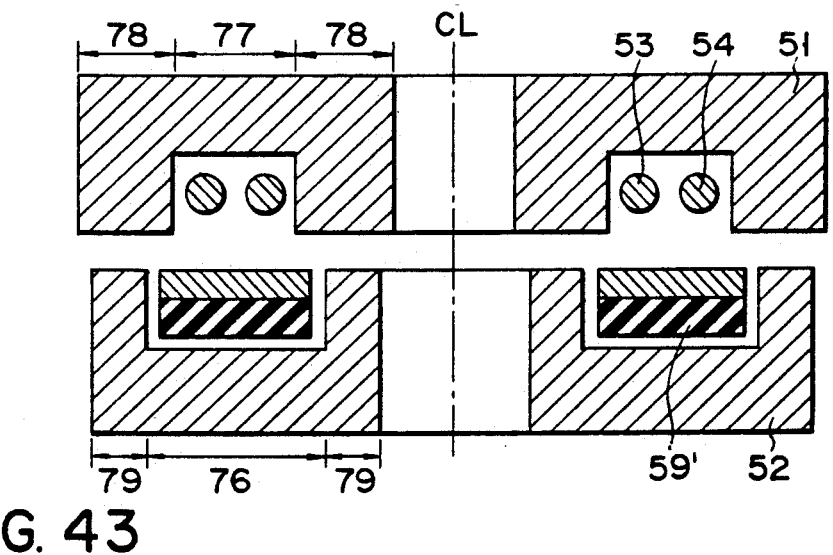
F I G. 43
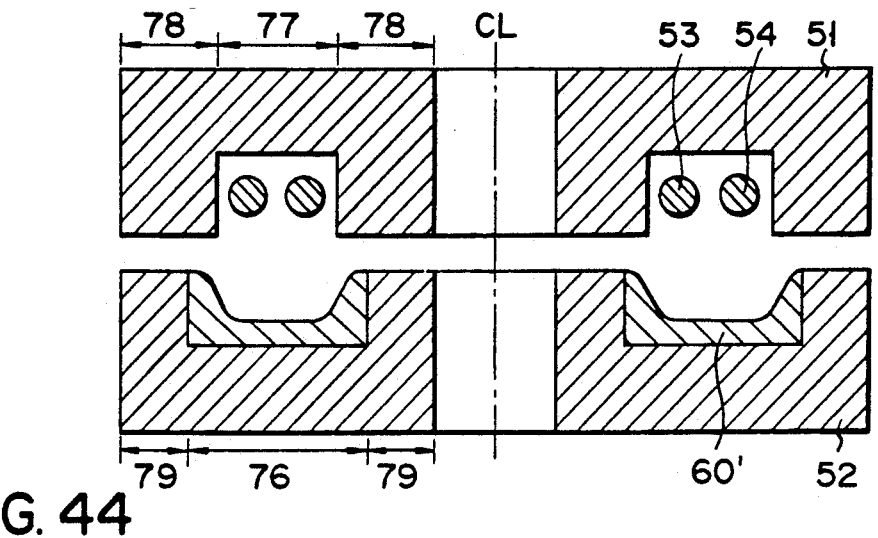
F I G. 44

ROTARY TYPE MAGNETIC RECORDING AND REPRODUCTION APPARATUS

BACKGROUND OF THE INVENTION

1. Field of the Invention

The present invention relates to a magnetic recording and reproduction apparatus for magnetically recording and/or reproducing information by using a magnetic tape as a recording medium.

2 Description of the Related Art

As shown in FIG. 1, in a video tape recorder (to be referred to as a "VTR" hereinafter) for current standard television systems (a term "television" will be abbreviated to as a "TV" hereinafter) such as an NTSC system, a PAL system, and an SECAM system, a recording circuit 25 and a reproduction circuit 29 provided at arbitrary positions except for a position of a rotary drum portion are coupled to a magnetic head 27 (in FIG. 1, a recording and reproduction head to be used in both recording and reproduction is shown) provided in the rotary drum portion via a rotary transformer 26. A recording current is supplied from the recording circuit 25 to the magnetic head 27 via the rotary transformer 26, and a reproduced signal extracted from the magnetic head 27 is supplied to the reproduction circuit 29 via the rotary transformer 26, thereby performing recording and reproduction for magnetic tape 28.

In recent years, wide-band, high-transmission rate VTRs (to be referred to as "wide-band/high-transmission rate VTRs" hereinafter) such as a high-resolution VTR and a digital VTR of a current TV system have been developed and put into practical use. In these wide-band/high-transmission rate VTRs, an inductance of a rotary transformer, a stray capacitance, and a cable coupling capacitance between the rotary transformer and a magnetic head, which are not so problematic in conventional VTRs, have been considered as problems. That is, transmission characteristics of an electromagnetic conversion system in magnetic recording are determined by a resonance frequency obtained by inductances of a magnetic head and a rotary transformer and the stray capacitance including an input capacitance of a reproduction circuit in a recording system, and is determined by a resonance frequency obtained by an inductance of the magnetic head, an inductance of the rotary transformer, and the stray capacitance including the input capacitance of the reproduction circuit in a reproduction system. In order to realize a wide-band/high-transmission rate VTR, therefore, no rotary transformer is desirably interposed between the magnetic head and the recording and reproduction circuits.

In a VTR of this type, therefore, as described in "Technical Bulletin of Institute of Electronics, Information and Communication Engineers", MR85-54, a recording circuit and a reproduction circuit are mounted in a rotary drum portion and connected directly to a magnetic head without using a rotary transformer, thereby widening recording and reproduction bands.

In addition, bands of a rotary transformer for transmitting signals between the rotary drum portion and an external portion (between the rotary drum portion and the other portion), a driver circuit for driving the rotary transformer, and a receiver circuit for receiving signals from the rotary transformer must be simultaneously widened. That is, as the recording and reproduction bands are determined in accordance with the input capacitances of the magnetic head and the reproduction circuit, a transmission band of the rotary transformer is determined in accordance with the inductance of the rotary transformer and the input capacitance or the stray capacitance of the receiver circuit. Therefore, a cable having a large capacitance, e.g., a coaxial cable having a large capacitance cannot be used to couple the driver and receiver circuits to the rotary transformer. In order to realize a wide band of the rotary transformer, therefore, the driver and receiver circuits must be mounted close to the rotary transformer. As a result, a scanner (an entire drum mechanism portion including a "rotary drum" and a "stationary drum" will be referred to as a "scanner" hereinafter) is complicated and enlarged since the driver and receiver circuits of the rotary transformer are mounted.

In addition, as described in "National Convention Record of the Institute of Television Engineers of Japan", Vol. 10, No. 41; VR87-S; T. Eguchi et al.; January, 1987, a VTR of this type must have at least six magnetic heads including those for normal reproduction and special-purpose reproduction. For example, a D-1 format 525 digital VTR employs 16 magnetic heads.

A rotary transformer is normally used for signal transmission between a rotary drum portion and an external portion (between the rotary drum portion and the other portion), and the number of channels of the rotary transformer must correspond to the number of magnetic heads mounted in the rotary drum. If, however, rotary transformers are mounted in a scanner in a number corresponding to the number of multi-channel magnetic heads, a mechanism of the scanner is enlarged and complicated, resulting in insufficient mechanical precision of each portion. Although a recording or reproduction circuit must be provided in a number corresponding to the number of magnetic heads similar to the rotary transformer, it can be made compact and light by adopting an IC arrangement. Since, however, the rotary transformer must have a wide range and a low crosstalk between channels, its miniaturization is limited.

In order to simplify an arrangement of the mechanism of the scanner and that of an electronic circuit including the recording and the reproduction circuits, therefore, the number of channels of the rotary transformer must be reduced.

In addition, since the recording and reproduction circuits corresponding to the multi-channel magnetic head are mounted, power consumption is increased. Furthermore, since thermal expansion is caused in each mechanism portion of the scanner due to heat generated by circuit elements, precision of the mechanism is degraded. Therefore, low power consumption is also required for the recording and reproduction circuits to be mounted in the rotary drum and a circuit portion at the stationary drum side.

SUMMARY OF THE INVENTION

As described above, in a wide-band/high-transmission rate VTR, if a recording or reproduction circuit corresponding to a multi-channel magnetic head is mounted in a rotary drum, power consumption of the circuit is increased. In addition, thermal expansion is caused in each mechanism portion of a scanner due to heat generated by circuit elements, thereby degrading mechanism precision.

In addition, if a transformer corresponding to the multi-channel magnetic head is mounted in the scanner, the mechanism of the scanner is complicated and enlarged to make it difficult to maintain satisfactory mechanical precision of each portion. Furthermore, a driver and a receiver for the rotary transformer must be mounted in the scanner in order to widen the band of the rotary transformer. As a result, the scanner mechanism is further complicated and enlarged.

It is, therefore, an object of the present invention to provide a magnetic recording and reproduction apparatus which can reduce the number of channels of a rotary transformer without degrading frequency characteristics, reduce power consumption of the entire circuit mounted on a rotary drum, and simplify and miniaturize a mechanism of a scanner portion.

A magnetic recording and reproduction apparatus of the present invention comprises a rotary drum to be driven to rotate, a first head provided in the rotary drum, a second head provided in the rotary drum to be enabled when the first head is disabled first and second amplifying circuit systems connected to said first and second head, respectively, to be enabled or disabled by a selection signal, a rotary transformer commonly connected to the first and second amplifying circuit systems, and selection signal generating means for supplying the selection signal to the first and second amplifying circuit systems in synchronism with rotation of the rotary drum.

By selectively switching enable and disable states of n amplifying circuit systems mounted in the rotary drum and commonly coupled to the rotary transformer, the amplifying circuit systems being included in a recording or reproduction circuit or a recording and reproduction circuit, an essential number of channels of the rotary transformer can be set to be 1/n the number of the magnetic heads and the amplifying circuit systems. In addition, since the enable and disable states are set by selectively switching the n amplifying circuit systems mounted in the rotary drum and constituting the recording or recording circuit or the recording and reproduction circuit, power consumption of the entire circuit can be reduced.

Since the essential channel number of the rotary transformer can be set to be 1/n, a mechanism of a scanner can be simplified to improve reliability, thereby realizing a compact size, a light weight, and a low manufacturing cost of the system.

According to the present invention, the number of channels of the rotary transformer can be reduced without degrading frequency characteristics, power consumption of the circuit mounted in the rotary drum can be reduced, and the mechanism of the scanner can be simplified and miniaturized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 6A and 6B are block diagrams showing basic circuit arrangements of recording and reproduction systems, respectively, of the magnetic recording and reproduction apparatus according to the first embodiment of the present invention;

FIG. 10 is a timing chart showing a series of time sequences of a switching operation for recording and reproduction circuits of the apparatus shown in FIGS. 8 and 9;

FIGS. 11A and 11B show a basic arrangement according to a first arrangement of a selective switching device, used in the first embodiment of the present invention shown in FIGS. 2 and 3, for generating a timing signal for performing switching upon each 180° rotation, in which FIG. 11A is a schematic sectional view of a cylinder system and FIG. 11B is a schematic plan view thereof;

FIG. 12 is a block diagram showing an arrangement of a circuit for performing selective control in the embodiment shown in FIGS. 11A and 11B;

FIG. 13 is a timing chart showing a series of sequences of a switching operation in the embodiment shown in FIGS. 11A and 11B;

FIGS. 14A and 14B show a basic arrangement according to a second arrangement of the selective switching device for generating a timing signal for performing switching upon each 180° rotation, in which FIG. 14A is a schematic sectional view of a cylinder system and FIG. 14B is a schematic plan view thereof;

FIG. 15 is a schematic view showing an arrangement of a reflection type photo sensor for explaining a principle of the present invention;

FIGS. 16A and 16B show a basic arrangement according to a third arrangement of the selective switching device for generating a timing signal upon each 180° rotation;

FIG. 17 is a schematic view for explaining an arrangement of a rotary transformer portion of one channel and its peripheral circuit associated with the recording system according to the first embodiment of the present invention;

FIG. 18 is a schematic view for explaining an arrangement of a rotary transformer portion of one channel and its peripheral circuit associated with the reproduction system according to the first embodiment of the present invention;

FIG. 19 is a schematic view for explaining an arrangement of a rotary transformer portion of one channel and its peripheral circuit associated with the recording and reproduction systems according to the second embodiment of the present invention;

FIG. 23 is a schematic view for explaining an arrangement of a main part of the fourth embodiment of the present invention using, for recording, a rotary transformer unit having a rotary member as shown in FIG. 20 and a stationary member in which a winding is wound in a winding slot;

FIG. 24 is a timing chart showing a series of sequences of an operation associated with switching of a reproduction circuit according to the embodiment shown in FIG. 23;

FIG. 25 is a schematic view for explaining an arrangement of a main part of the fifth embodiment of the present invention using, for recording and reproduction, a rotary transformer unit having a rotary member as shown in FIG. 20 and a stationary member in which a winding is wound in a winding slot;

FIG. 26 is a timing chart showing a series of sequences of an operation associated with switching of the recording and reproduction circuits of the embodiment shown in FIG. 25;

FIG. 30 is a sectional view schematically showing an arrangement of the seventh embodiment of the present invention for solving problems of a rotary transformer apparatus for performing signal transmission between a rotary member and a stationary member in which a plurality of windings are wound in a single slot of one member while a single winding is wound in a slot of the other member;

FIG. 31 is a sectional view schematically showing an arrangement of the eighth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 32 is a sectional view schematically showing an arrangement of the ninth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 33 is a sectional view schematically showing an arrangement of the tenth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 34 is a sectional view schematically showing an arrangement of the 11th embodiment of the present invention for solving problems of a rotary transformer apparatus for performing signal transmission between a rotary member and a stationary member in which a plurality of windings are wound in a single slot of one member while a single winding is wound in a slot of the other member;

FIG. 35 is a plan view schematically showing an arrangement of one member shown in FIG. 33;

FIG. 42 is a sectional view schematically showing an arrangement of the 18th embodiment of the present invention;

FIG. 43 is a sectional view schematically showing an arrangement of the 19th embodiment of the present invention;

FIG. 44 is a sectional view schematically showing an arrangement of the 20th embodiment of the present invention;

DETAILED DESCRIPTION OF THE PREFERRED EMBODIMENTS

Embodiments of the present invention will be described in detail below with reference to the accompanying drawings.

Figure 1:
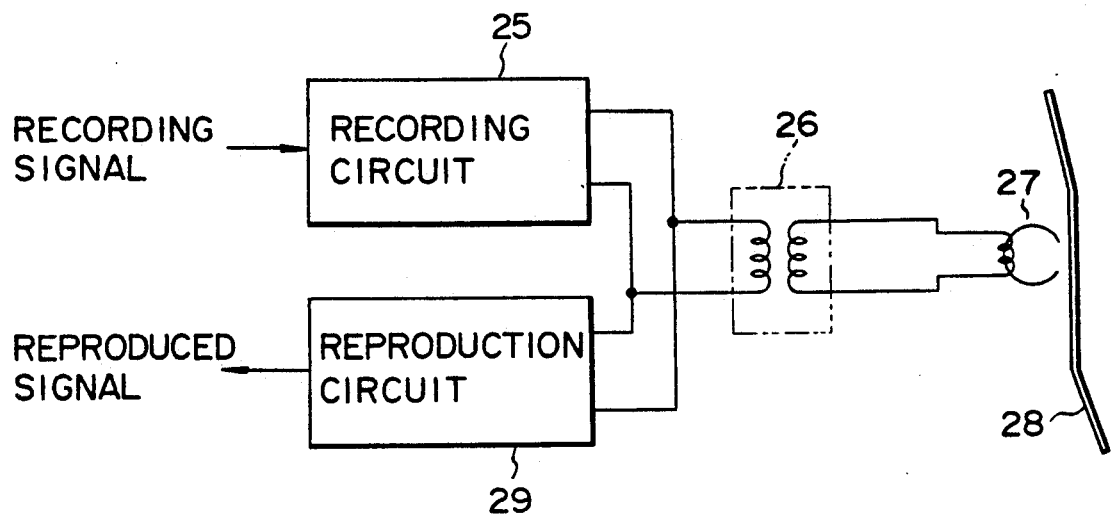
FIG. 1 is a block diagram schematically showing an arrangement of a recording and reproduction system of a conventional VTR.
Figure 2:
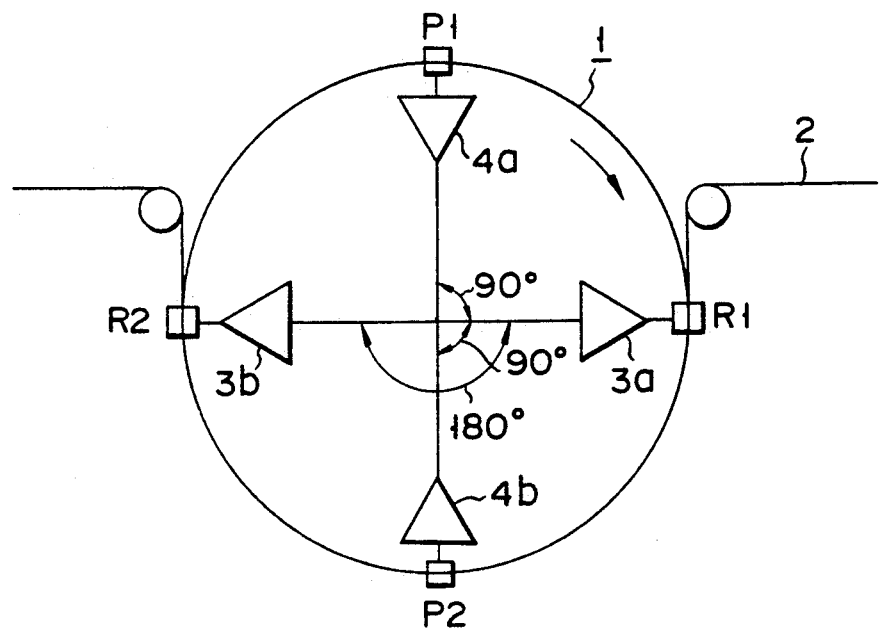
FIG. 2 is a schematic view showing a basic arrangement of a scanner portion of a magnetic recording and reproduction apparatus according to the first embodiment of the present invention.
Figure 3:
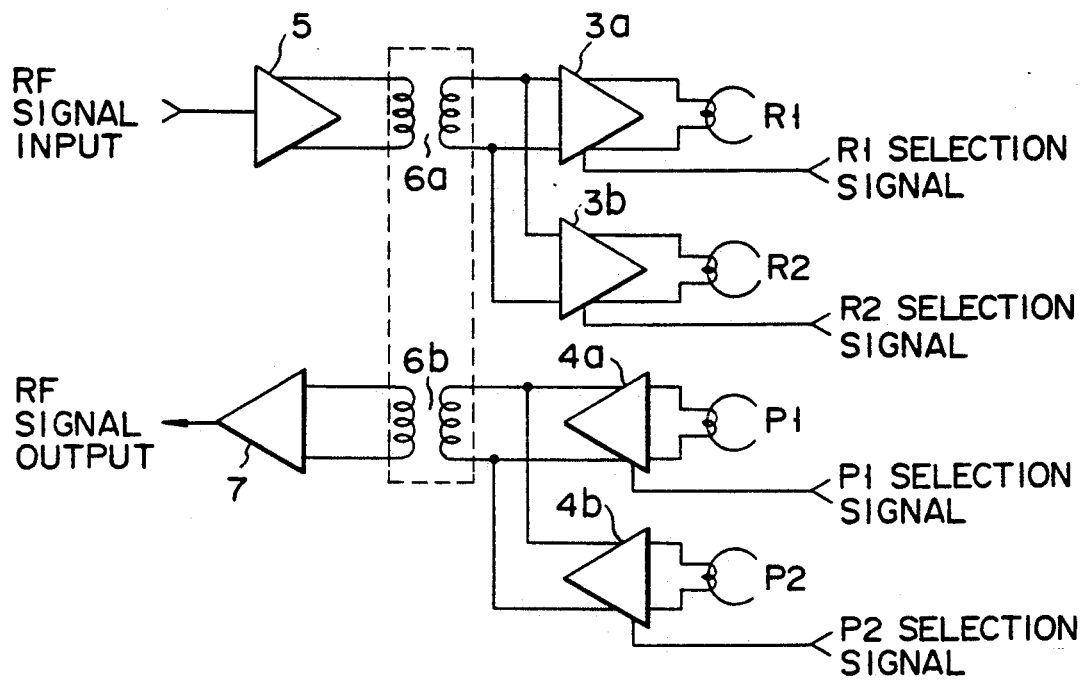
FIG. 3 is a circuit diagram showing a practical circuit having the basic arrangement shown in FIG. 2.
Figure 4:
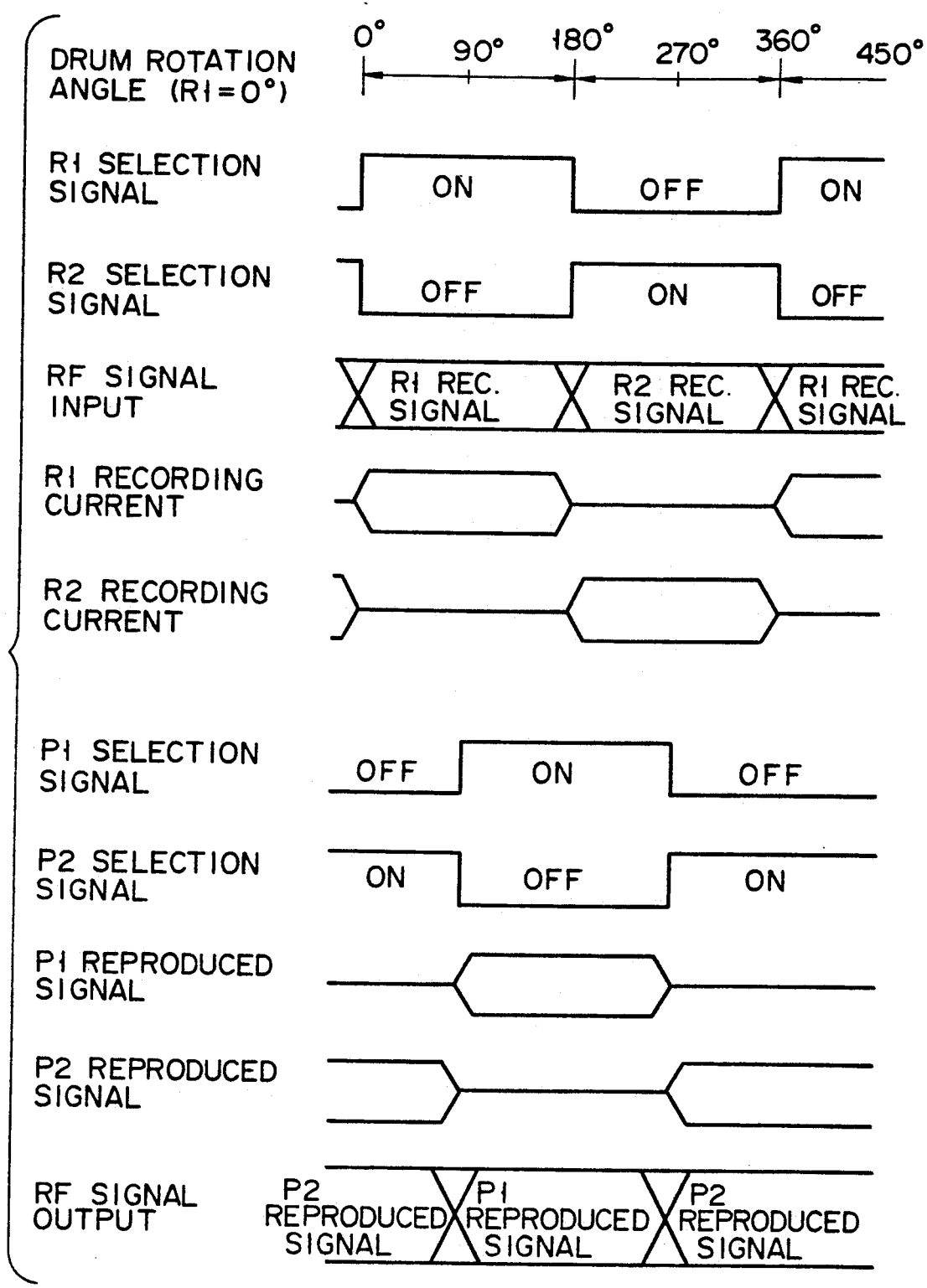
FIG. 4 is a timing chart showing a series of time sequences of a switching operation for recording and reproduction circuits in the apparatus shown in FIGS. 2 and 3.

FIG. 2 schematically shows a basic arrangement of a scanner portion of a magnetic recording and reproduction apparatus according to the first embodiment of the present invention. FIG. 3 shows a practical circuit having the arrangement shown in FIG. 2, and FIG. 4 shows a series of time sequences of a switching operation of the recording and reproduction circuits.

In the first embodiment, assume that an effective recording area angle of a magnetic tape 2 is 180°. The magnetic tape 2 is wound around the circumferential surface of a rotary drum of a scanner 1. The tape 2 is in contact with the circumferential surface of the rotary drum through 180°. This contact portion serves as an effective recording area of an information signal of the tape 2.

A recording circuit 3a amplifies an information signal supplied from a rotary transformer 6a (shown in FIG. 3) and supplies the amplified signal to a recording magnetic head R1, thereby driving the magnetic head R1. A recording magnetic head R2 is arranged at a position shifted from the magnetic head R1 by 180° so that the rear surfaces of the two heads oppose each other. The magnetic head R2 is driven by a recording circuit 3b having an input side commonly connected to the recording circuit 3a. The information signal is reproduced from the magnetic tape 2 to a reproduction magnetic head P1, amplified by a reproduction circuit 4a, and transmitted outside the rotary drum by a rotary transformer 6b (shown in FIG. 3) connected to the output side of the reproduction circuit 4a. A reproduction magnetic head P2 is arranged at a position shifted from the magnetic head P1 by 180° so that the rear surfaces of the two heads oppose each other. An information signal reproduced by the magnetic head P2 is amplified by a reproduction circuit 4b having an output side commonly connected to the reproduction circuit 4a.

An information signal (to be referred to as an "RF signal" hereinafter) to be recorded in a magnetic tape is amplified by a rotary transformer driving circuit 5 as an amplifier and transmitted to the rotary drum portion by the rotary transformer 6a. The RF signal to be input to the rotary transformer driving circuit 5 includes both information signals to be recorded by the magnetic heads R1 and R2. The recording circuits 3a and 3b have input sides commonly connected to the rotary transformer 6a. As shown in FIG. 4, the recording circuits 3a and 3b are alternately switched to enable and disable states upon each 180° rotation by R1 and R2 selection signals having opposite phases, respectively. The recording circuit 3a (3b) amplifies the input RF signal in its enable state and drives the magnetic head R1 (R2) by the amplified RF signal, thereby recording the RF signal corresponding to an R1 (R2) recording current in a magnetic tape.

Reproduction of the RF signal recorded in the magnetic tape will be described below. The RF signals reproduced from the magnetic tape by the magnetic heads P1 and P2 are amplified by the reproduction circuits 4a and 4b, respectively. The rotary transformer 6b commonly connected to the output sides of both the reproduction circuits 4a and 4b is driven to transmit the reproduced RF signals outside the rotary drum portion. As shown in FIG. 4, the reproduction circuits 4a and 4b are alternately switched to enable and disable states upon each 18020 rotation by P1 and P2 selection signals having opposite phases, respectively. P1 and P2 reproduced signals as reproduced RF signals reproduced from the magnetic heads P1 and P2 in the enable state are transmitted outside the rotary drum portion by the commonly connected rotary transformer 6b. The P1 and P2 reproduced signals transmitted from the rotary transformer 6b are received by a rotary transformer receiving circuit 7, amplified as needed, and transmitted to the following circuit as an RF signal output. The RF signal output supplied from the rotary transformer receiving circuit 7 upon this switching operation includes both the RF signals reproduced from the magnetic heads P1 and P2, i.e., both the P1 and P2 reproduced signals.

A method of reducing the number of channels of the rotary transformers 6a and 6b will be described below.

The input sides of the recording circuits 3a and 3b are commonly connected to the rotary transformer. Therefore, in order to prevent degradation in frequency characteristics of the recording circuits 3a and 3b, emitter followers or Darlington emitter followers are used as circuits of input stages of the circuits 3a and 3b so as to increase their input impedances. The outputs of the reproduction circuits 4a and 4b are commonly connected to the rotary transformer. Therefore, in order to prevent degradation in frequency characteristics of one of the reproduction circuits 4a and 4b in an enable state, an output of the other reproduction circuit in a disable state is kept in a high-impedance state.

Figure 5:
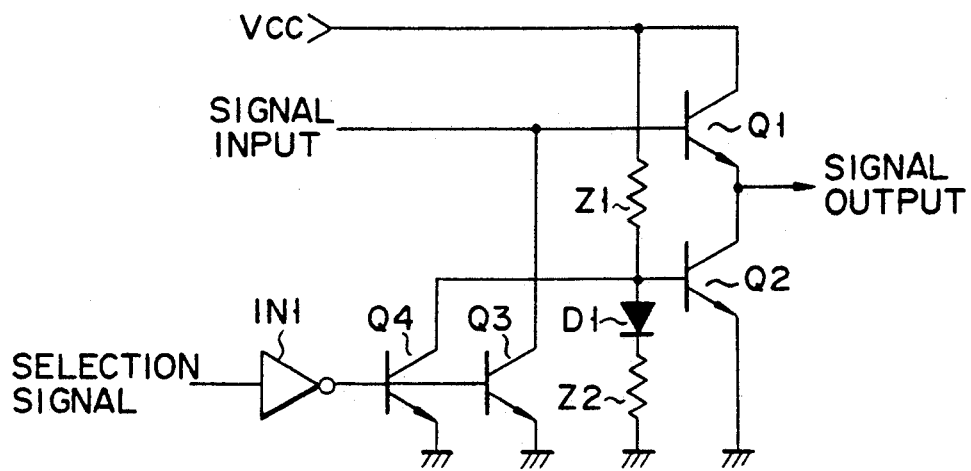
FIG. 5 is a circuit diagram showing a basic arrangement of a circuit for increasing an impedance of an output from the reproduction circuit.

For example, the circuit shown in FIG. 5 is used to cause the output impedance of the reproduction circuit to be high. Although the outputs of the reproduction circuits according to this embodiment are balanced outputs, only one side output is shown to simplify the explanation. In a reproduction circuit of this type, an emitter follower or a Darlington emitter follower is normally used as an output stage in order to obtain sufficient driving power against a load. Referring to FIG. 5, a transistor Q1 having an emitter follower connection is used. A transistor Q2, a diode D1, and resistors Z1 and Z2 constitute a constant current circuit for flowing a constant current to the emitter follower transistor Q1. Switching between enable and disable states of the emitter follower is performed by transistors Q3 and Q4 and an inverter IN1. When a selection signal is at "H" (high level), the bases of the transistors Q3 and Q4 go to "L" (low level). Therefore, the transistors Q3 and Q4 are turned off, and the emitter follower of the transistor Q1 operates to output an RF signal. When the selections signal is at "L", the bases of the transistors Q3 and Q4 go to "H". Therefore, the transistors Q3 and Q4 are turned on, and the base of the emitter follower transistor Q1 goes to "L". Therefore, the transistor Q1 is turned off to set its output in a high-impedance state.

A method of simplifying a circuit by adopting the arrangement of this embodiment will be described below.

Figure 7A:
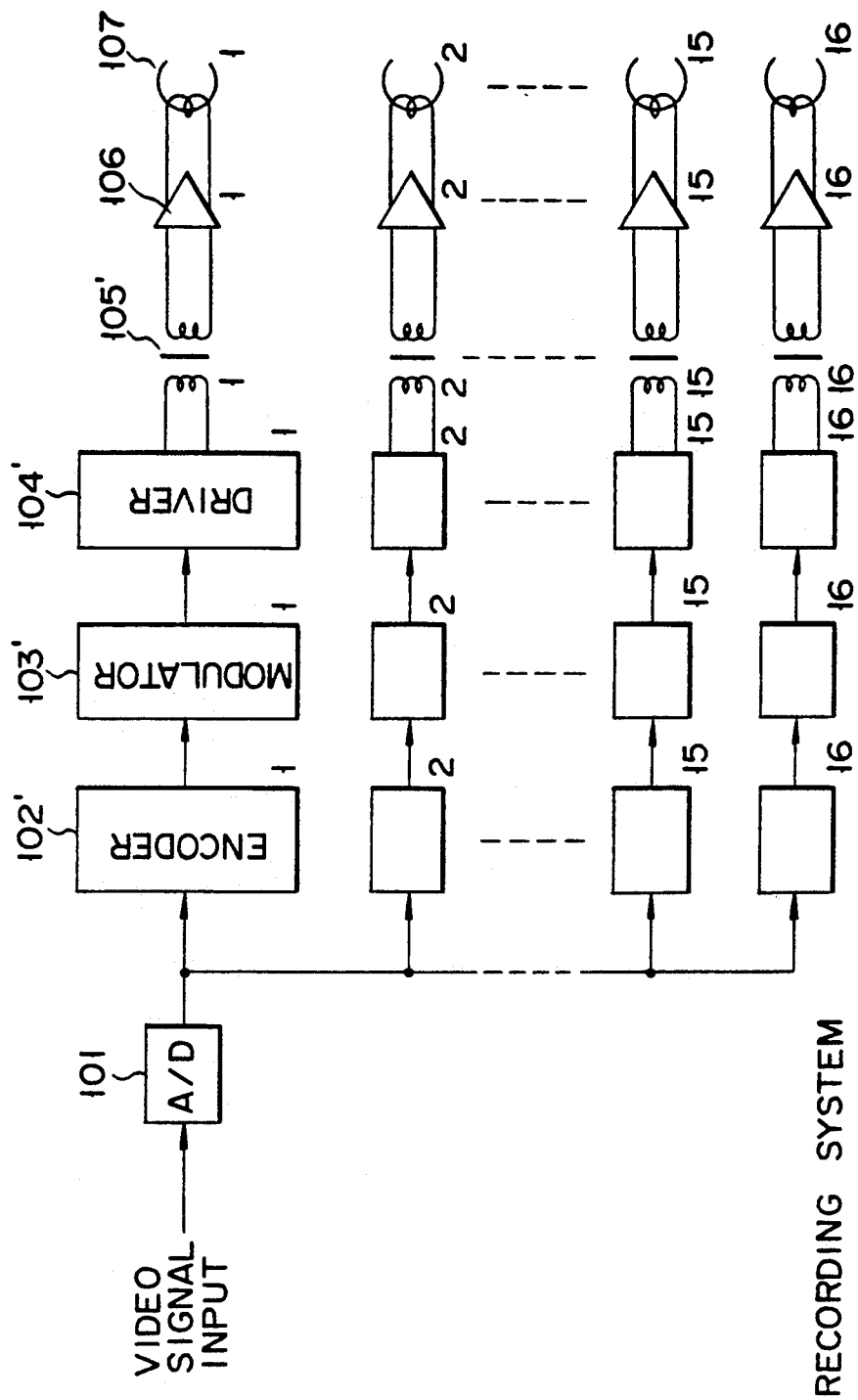
FIGS. 7A and 7B are block diagrams showing basic arrangements of recording and reproduction systems, respectively, of a conventional magnetic recording and reproduction apparatus.
Figure 7B:
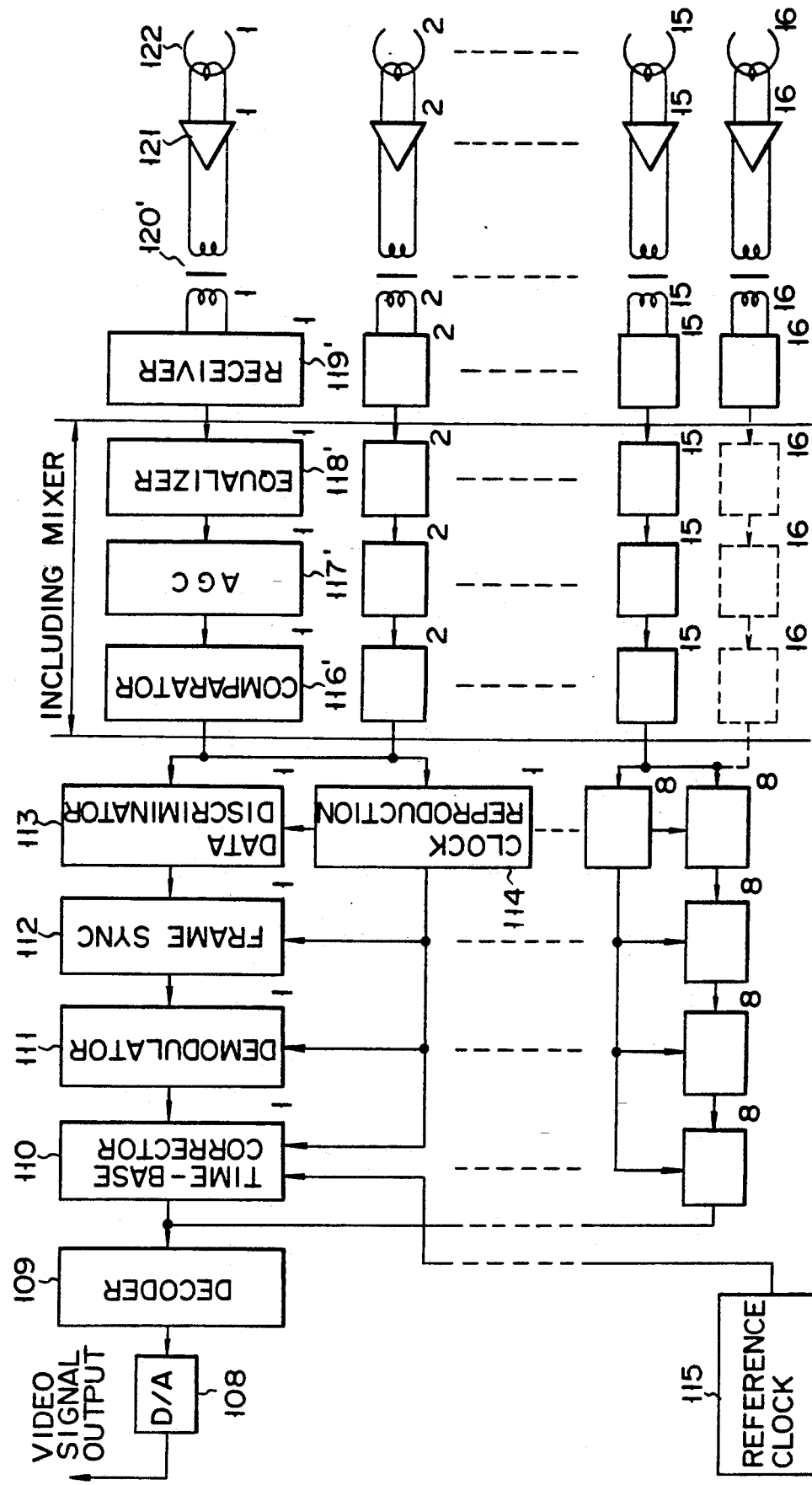

FIGS. 6A and 6B show circuits of recording and reproduction systems adopting this embodiment, respectively, and FIGS. 7A and 7B show circuits of recording and reproduction systems of a conventional apparatus, respectively, for comparison.

Each arrangement has 16 heads by a so-called 180° lap in which two heads of each pair are arranged through 180° so that their rear surfaces oppose each other. Although a difference between the two arrangements is apparent from FIGS. 6A to 7B, a circuit of a recording system shown in FIG. 6A will be described first. An input video signal is converted into a digital signal by an A/D (analog-to-digital) converter 101, and the converted digital signal is distributed to and encoded by eight encoders 102. Each of the eight divided signals is input to a stator side of a corresponding one of eight rotary transformers 105 via a corresponding pair of eight modulators 103 and eight rotary transformer drivers 104. 16 recording heads 107 provided at rotor sides of the rotary transformers 105 are connected to recording amplifiers 106 and to the rotor sides of the eight rotary transformers 105 by the arrangement as described above. In the conventional apparatus shown in FIG. 7A, 16 rotary transformers 105', 16 encoders 102', 16 modulators 103', and 16 drivers 104' are required for 16 heads 107.

In a circuit of the reproduction system according to this embodiment shown in FIG. 6B, only eight rotary transformers 120 are required for 16 reproduction heads 122, and the number of each of rotary transformer receivers 119, equalizers 118, AGC (automatic gain controllers) circuits 117, and comparators 116 for analog-to-digital conversion is only eight. In FIG. 6B D/A (digital-to-analog) converter 108, decoder 109, timebase correctors 110, demodulators 111, frame synchronization circuits 112, data discriminators 113, clock reproduction circuits 114, reference clock generator 115 and reproduction amplifiers 121 are also shown. In the conventional apparatus shown in FIG. 7B, however, the number of each of rotary transformer receivers 119', equalizers 118', AGC circuits 117', and comparators 116' is 16. In addition, if one intend to reduce the number of the circuits 116' to 118', the conventional apparatus requires a mixer (not shown) between the circuits 116' to 118', for mixing pieces of information from the heads opposing through 180°. An arrangement from a data discriminator 113 to a D/A converter 108 of this embodiment is substantially the same as that of the conventional apparatus.

Figure 8:
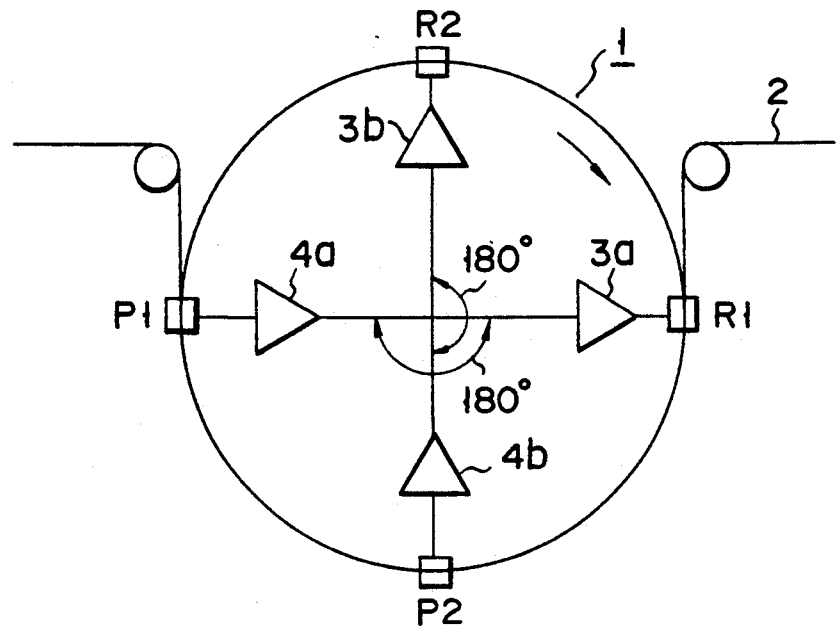
FIG. 8 is a schematic view showing a basic arrangement of a scanner portion of a magnetic recording and reproduction apparatus according to the second embodiment of the present invention
Figure 9:
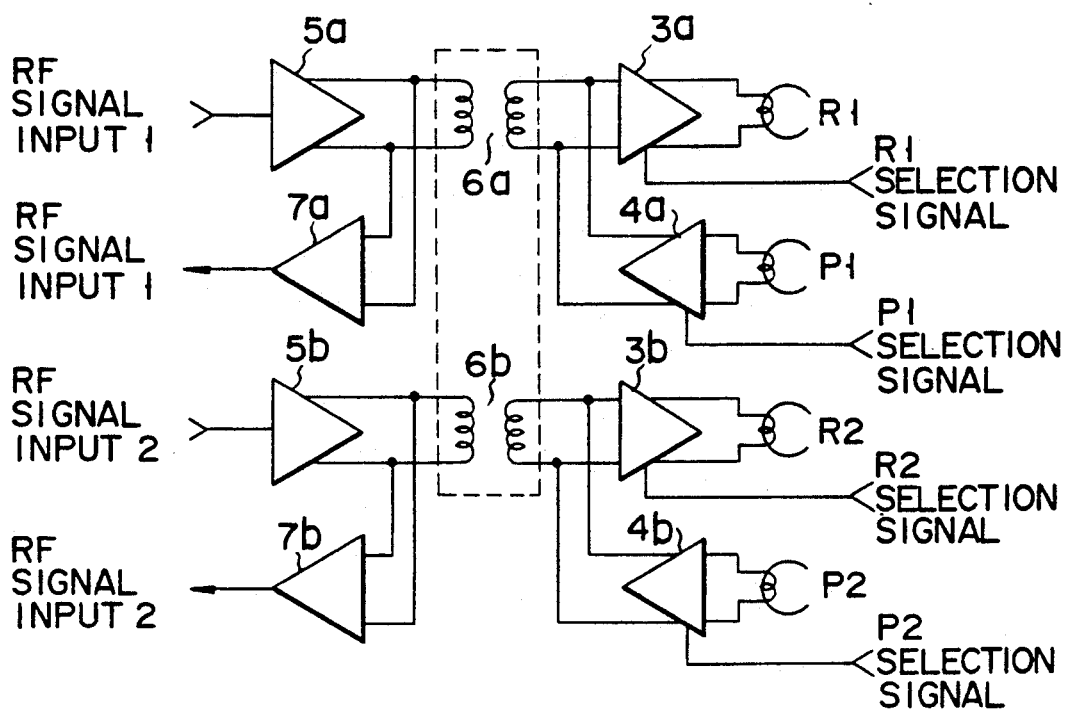
FIG. 9 is a circuit diagram showing a practical circuit having the arrangement shown in FIG. 8.

FIG. 8 shows a schematic basic arrangement of a scanner portion of a magnetic recording and reproduction apparatus according to the second embodiment of the present invention. FIG. 9 shows a practical circuit having the arrangement shown in FIG. 8. Similar to the above first embodiment, a magnetic tape 2 is wound around the circumferential surface of a rotary drum of a scanner 1. The tape 2 is in tight contact with the circumferential surface of the rotary drum through 180°, and this contact portion serves as an effective recording area of an information signal of the tape 2. In this embodiment, recording and reproduction circuits are commonly connected to a rotary transformer. A recording circuit 3a amplifies an information signal supplied from a rotary transformer 6a and supplies the amplified signal to a magnetic head R1, thereby driving the recording magnetic head R1 by the information signal. A reproduction magnetic head P1 is arranged at a position on the rotary drum shifted from the magnetic head by 180°. An information signal reproduced from the magnetic tape by the magnetic head P1 is amplified by a reproduction circuit 4a and transmitted outside the rotary drum via the rotary transformer 6a connected to the output of the reproduction circuit 4a. A recording magnetic head R2 is driven by a recording circuit 3b. A reproduction magnetic head P2 is arranged at a position shifted from the magnetic head R2 by 180°. An information signal is amplified by a reproduction circuit 4b having an output side commonly connected to the input side of a recording circuit 3b. A rotary transformer 6b is used to transmit an RF signal to the recording circuit 3b and to transmit an RF signal outside the rotary drum portion from the reproduction circuit 4b.

An information signal to be recorded in a magnetic tape, i.e., an RF signal is amplified by a rotary transformer driving circuit 5a and transmitted into a rotary drum by a rotary transformer 6a. A recording circuit 3a having an input side connected to the rotary transformer 6a is sequentially switched between enable and disable states upon each 180° rotation by an R1 selection signal (to be described later). When the recording circuit 3a is in the enable state, a magnetic head R1 is driven to record the RF signal in the magnetic tape.

Reproduction of the RF signal from the magnetic tape will be described below. The RF signal reproduced from the magnetic tape by magnetic head P1 is amplified by a reproduction circuit 4a and supplied to the rotary transformer 6a to which the output side of the reproduction circuit 4a and the input side of the recording circuit 3a are commonly connected. The rotary transformer 6a transmits the reproduced RF signal supplied from the reproduction circuit 4a to outside the rotary drum. The reproduction circuit 4a is sequentially switched between enable and disable states upon each 180° rotation by a P1 selection signal P1. When the reproduction circuit 4a is in the enable state, the RF signal reproduced from the magnetic head P1 is transmitted outside the rotary drum by a rotary transformer 6b. The reproduced RF signal transmitted from the rotary transformer 6b is received by a rotary transformer receiving circuit 7b and transmitted to a circuit at a subsequent stage. Note that an operation of a system of a rotary transformer driving circuit 5b, the rotary transformer 6b, a recording circuit 3b, a reproduction circuit 4b, and the rotary transformer receiving circuit 7b is similar to that of the above circuit.

An arrangement of an output circuit of the reproduction circuit 4 and the rotary transformer receiving circuit 7 may be the same as that of the circuit shown in FIG. 5. Note that a circuit associated with switching selection of the rotary transformer receiving circuit 7 is not shown.

FIG. 10 shows a series of time sequences of a switching operation of the above recording and reproduction circuits.

A method of sequentially switching the recording or reproduction circuit upon each 180° rotation and a device therefor (to be referred to as a "selective switching device" hereinafter) will be described below.

FIGS. 11A and 11B show a basic arrangement of a first arrangement of a selective switching device according to the first embodiment of the present invention described above. FIG. 11A is a schematic sectional view showing a scanner (cylinder system), and FIG. 11B is a schematic plan view of the system.

A rotary drum 8 has photodetectors 13a, 13b, 14a, and 14b, and a stationary drum 9 has a recording LED (light-emitting diode) 11 and a reproduction LED 12. A recording circuit is controlled by the recording LED 11 at the stationary drum 9 side, a reproduction circuit is controlled by the reproduction LED 12, and the recording and reproduction LEDs 11 and 12 are controlled by a recording/reproduction controller 10. The photodetectors at the rotary drum 8 side for directly controlling the recording and reproduction circuits in response to control light from the recording and reproduction LEDs 11 and 12 are mounted in a rotation position corresponding to a rotation position of a recording and reproduction heads. That is, as shown in FIG. 11B, the photodetector 13a for controlling the recording circuit of a magnetic head R1 is provided at the same rotation position as that of the magnetic head R1, and the photodetector 13b for controlling the recording circuit of a magnetic head R2 is provided at the same rotation position as that of the magnetic head R2. The photodetector 14a for controlling the reproduction circuit of a magnetic head P1 is provided at the same rotation position as that of the magnetic head P1, and the photodetector 14b for controlling the recording circuit of a magnetic head P2 is provided at the same rotation position as that of the magnetic head P2.

An operation of the selective switching device described below with reference to FIGS. 11A, 11B, and 12. FIG. 13 shows a series of time sequences of the switching operation of the selective switching device.

In order to simplify the explanation, assume that both the recording and reproduction LEDs 11 and 12 are turned on (to emit light) by the recording/reproduction controller 10.

A recording system will be described first. Referring to FIG. 11B, since the rotary drum 8 rotates in a direction indicated by an arrow and the positions of the photodetector 13a and the recording LED 11 coincide with each other, the photodetector 13a outputs an "H" signal. Therefore, since the output of the photodetector 13a is connected to the set input terminal of a set/reset flip-flop 15a, the "H" signal is output from the Q output terminal of the flip-flop 15a. When the rotary drum 8 further rotates in the direction indicated by the arrow shown in FIG. 11B, the output from the photodetector 13a goes to "L". when the rotary drum 8 rotates through 180°, an output from the photodetector 13b connected to the reset input terminal of the flip-flop 15a goes to "H". Therefore, a Q output from the flip-flop 15a goes to "L". Thereafter, Q and $\bar{Q}$ outputs from the flip-flop 15a sequentially, repeatedly go to "H" and "L" upon each 180° rotation of the rotary drum 8. The Q output of "H" level from the flip-flop 15a controls the R1 recording circuit to be in an enable state, while the Q output of "L" level controls the R1 recording circuit to be in a disable state. The $\bar{Q}$ output of "H" level from the flip-flop 15a controls the R2 recording circuit to be in an enable state, while the $\bar{Q}$ output of "L" level controls the R2 recording circuit to be in a disable state.

An operation of a circuit of the reproduction system is basically the same as that of the recording circuit. Note that the photodetector 14a starts its operation 90° after the photodetector 13a and the photodetector 14b starts its operation 90° after the photodetector 13b. Q and $\bar{Q}$ outputs from a set-reset flip-flop 15b sequentially go to "H" and "L" upon each 180° rotation of the rotary drum 8. When the Q output from the flip-flop 15b is at "H" level, the P1 reproduction circuit is set in an enable state. When the Q output is at "L" level, the P1 reproduction circuit is set in a disable state. When the $\bar{Q}$ output from the flip-flop 15b is at "H" level, the P2 reproduction circuit is set in an enable state. When the $\bar{Q}$ output is at "L" level, the P2 reproduction circuit is set in a disable state.

Note that the recording and reproduction LEDs 11 and 12 are ON/OFF-controlled in accordance with a mode of a VTR. That is, only the recording LED 11 is turned on in a recording mode, only the reproduction LED 12 is turned on in a reproduction mode, and both the recording and reproduction LEDs 11 and 12 are turned on in a simultaneous reproduction/recording mode.

Figure 14A:
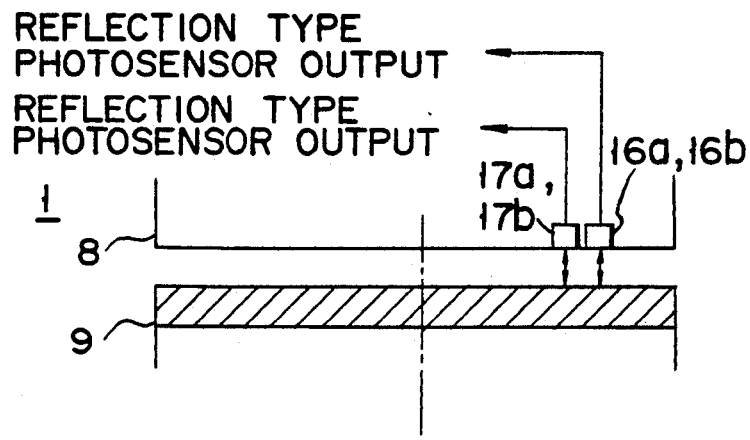
Figure 14B:
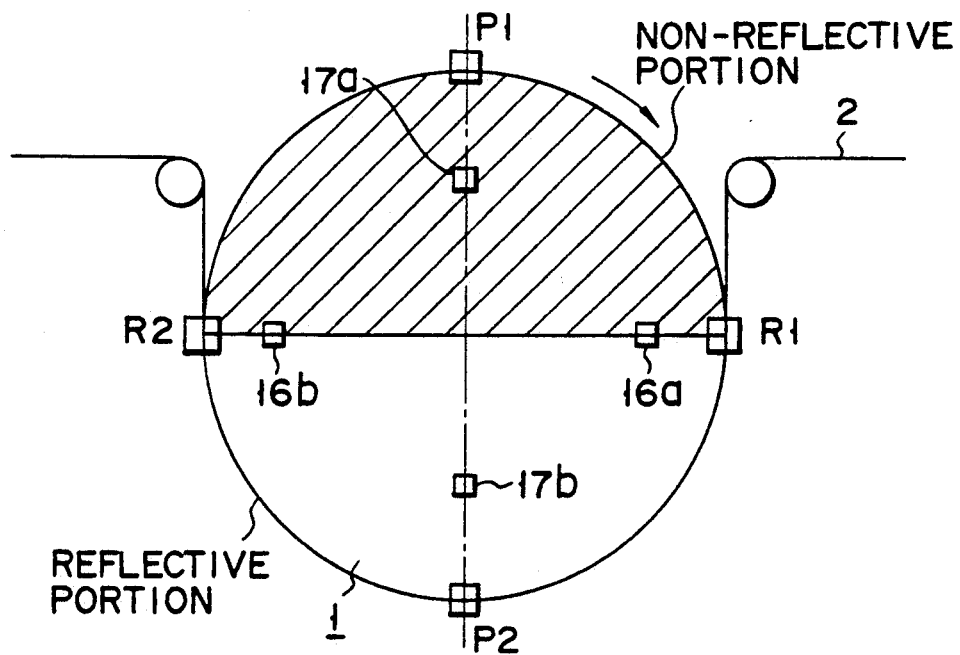

FIGS. 14A and 14B show a basic arrangement of a second arrangement of the selective switching device. FIG. 14A is a schematic sectional view showing a scanner system, and FIG. 14B is a schematic plan view of the system. In this arrangement, as shown in FIG. 14B, reflection type photo sensors 16a, 16b, 17a, and 17b for controlling recording and reproduction are mounted at a rotary drum 8 side at positions corresponding to magnetic heads R1, R2, P1, and P2, respectively. If an angle of an effective recording area is 180°, a reflective portion, e.g., a mirror is arranged at a recording side of a stationary drum 9, and a non-reflective portion which cannot be detected by a reflection type photo sensor is arranged at its nonrecording side. Note that each of the reflection type photo sensors 16a, 16b, 17a, and 17b is a unit constituted by an LED 18 and a photodetector 19 such as a photodiode or phototransistor as shown in FIG. 15. Various types of reflection type photo sensors are available. For example, an "H" signal is output when a reflective portion is present on an opposing surface, and an "L" signal is output when no reflective portion is present.

In this embodiment, an arrangement using a photo sensor which outputs the signals as described above is used. The rotary drum rotates in a direction indicated by an arrow shown in FIG. 14B, and the recording circuit of the magnetic head R1 is controlled by the reflection type photo sensor 16a and set in an enable state when it passes through a recording area side having a reflective portion. The recording circuit is set in a disable state when it passes through a non-reflective portion. Similarly, the recording circuit of the magnetic head R2 is controlled by the reflection type photo sensor 16b, the reproduction circuit of the magnetic head P1 is controlled by the reflection type photo sensor 17a, and the reproduction circuit of the magnetic head P2 is controlled by the reflection type photo sensor 17b. In this embodiment, the reflection type photo sensors 16a, 16b, 17a, and 17b generate a 180° selection signal which can be input directly to the recording or reproduction circuit. In this case, switching between recording and reproduction is performed by a signal supplied to the photo sensors 16a, 16b, 17a, and 17b via, e.g., a slip ring.

According to the arrangement of this embodiment, in the arrangement of the stationary drum side, a glass mask having a reflective portion corresponding to only an effective recording area need only be arranged, and a mechanism of the scanner is simplified.

FIGS. 16A and 16b show a basic arrangement of a third arrangement of the selective switching device. FIG. 16A is a schematic sectional view showing a cylinder system, and FIG. 16B is a schematic plan view of the system. In this arrangement, as shown in FIG. 16B, photodetectors 20a, 20b, 21a, and 21b for recording and reproduction are mounted in a rotary drum 8 at positions corresponding to magnetic heads R1, R2, P1, and P2, respectively. In a stationary drum 9, if an angle of an effective recording area is 180°, a plurality of recording LEDs and reproduction LEDs are densely arranged in an arcuated pattern each within a range corresponding to the effective recording area in correspondence with the photodetectors 20a, 20b, 21a, and 21b. In this embodiment, a plurality of LEDs for recording and reproduction are recording and reproduction LED arrays 22 and 23.

A recording circuit is controlled by the recording LED array 22 at the stationary drum side, a reproduction circuit is controlled by the reproduction LED array 23, and the recording and reproduction LED arrays 22 and 23 are controlled by a recording/reproduction controller 24. The photodetectors at the rotary drum side for directly controlling the recording and reproduction circuits in response to control light from the recording and reproduction LED arrays 22 and 23 are provided at positions corresponding to recording and reproduction heads as shown in FIG. 16B. The photodetector 20a for controlling the recording circuit of a magnetic head R1 is arranged at a position corresponding to the magnetic head R1, and the photodetector 20b for controlling the recording circuit of a magnetic head R2 at a position shifted from the magnetic head R1 by 180° is arranged at a position corresponding to the magnetic head R2. The photodetector 21a for controlling the reproduction circuit of a magnetic head P1 is provided at a position corresponding to the magnetic head P1, and the photodetector 21b for controlling the reproduction circuit of a magnetic head P2 at a position shifted from the magnetic head P1 by 180° is mounted in a position corresponding to the magnetic head P2.

An operation of the above selective switching device will be described below.

The rotary drum 8 rotates in a direction indicated by an arrow shown in FIG. 16B, and the recording circuit of the magnetic head R1 is controlled by the photodetector 20a. That is, the recording circuit of the magnetic head R1 is set in an enable state while the photodetector 20a opposes the recording LED array 22 corresponding to the recording area, and set in a disable state while the photodetector 20a passes through a region in which the recording LED array 22 is not present Similarly, the recording circuit of the magnetic head R2 is controlled by the photodetector 20b. The reproduction circuit of the magnetic head P1 is controlled by the photodetector 21a. That is, the reproduction circuit of the magnetic head P1 is set in an enable state while the photodetector 21a opposes the reproduction LED array 23 corresponding to the recording area, and set in a disable state while the photodetector 21a passes through a region in which the reproduction LED array 23 is not present. The reproduction circuit of the magnetic head P2 is controlled by the photodetector 21b. In this arrangement, the photodetectors 20a, 20b, 21a, and 21b generate a 180° selection signal which can be input directly to the recording or reproduction circuit.

According to the above arrangement, in the stationary drum, since a plurality of LEDs corresponding to the effective recording area need only be arranged, a mechanism of the cylinder system is simple.

Note that although an LED is used as a light-emitting element for use in recording/reproduction control in each of the above arrangements, another light-emitting element such as a EL (electroluminescence), a semiconductor laser, or a plasma display may be used.

In the above embodiment, a rotary drum type VTR has been described. The present invention, however, can be applied to a VTR of a disc type or a medium drum type as another magnetic head mounting system.

In the above embodiment, switching is performed between a rotary transformer having one channel and a recording or reproduction circuit having two channels. Switching, however, can be similarly performed for a recording or reproduction circuit or a recording and reproduction circuit having more channels. For example, if a recording head and a recording circuit have eight channels, a reproduction head and a reproduction circuit have eight channels, and an effective recording area angle is 180°, a rotary transformer need only have eight channels.

As has been described above, by sequentially, selectively switching a recording or reproduction circuit or a recording and reproduction circuit between enable and disable states, the number of channels of a rotary transformer can be reduced to be 1/n (n=360/R: where R is the effective recording area angle and n is a natural number) the number of magnetic heads and recording circuits, magnetic heads and reproduction circuits, or magnetic heads and circuits for performing both recording and reproduction.

Since n recording or reproduction circuits or n recording and reproduction circuits are sequentially, selectively switched between enable and disable state, power consumption of the circuits can be reduced. In addition, by reducing the number of channels of a rotary transformer to be 1/n, a mechanism of a scanner portion can be simplified to improve reliability. As a result, the system can be made compact and light in weight at a low manufacturing cost, and the numbers of driver circuits and receiver circuits of the rotary transformer can be 1/n.

Furthermore, since the number of channels of the rotary transformer can be reduced to be 1/n, inertia of a rotary drum is reduced to reduce a load on a rotary drum motor, and rotation of the rotary drum can reach a static rotational speed within a short time period, thereby reducing a time required for starting transmission of an image.

As described above, the problems of the conventional apparatuses can be solved by commonly connecting recording or reproduction circuits or recording and reproduction circuits, mounted together with magnetic heads on a rotary drum, for performing recording or reproduction of an information signal to a rotary transformer, and sequentially, selectively switching the recording or reproduction circuits or recording and reproduction circuits to an enable state in accordance with a rotation position of the rotary drum.

The recording or reproduction circuits or recording and reproduction circuits are arranged at different angular positions with respect to a rotation angular direction of a rotary drum, i.e., a rotary member of a rotary transformer. Therefore, if the circuits are commonly connected to a rotary transformer in which a single winding is provided in a single winding slot as in a conventional transformer, the position in a rotation angular direction of lead wires of the rotary member of the rotary transformer differs from that in a rotation angular direction of the circuits by a maximum of 180°. In this case, a circuit having a larger difference with respect to the position in the rotation angular direction of the lead wires of the rotary member of the rotary transformer requires a longer cable for coupling a driver or receiver circuit, i.e., the recording or reproduction circuits or recording and reproduction circuits, and the rotary transformer. Therefore, a coupling capacitance between the driver or receiver circuit and the rotary transformer is increased to degrade transmission characteristics. As a result, a difference may be produced between characteristics of the n recording or reproduction circuits or recording and reproduction circuits.

For example, FIG. 17 shows an arrangement of a rotary transformer portion of one channel according to the above first embodiment in which two recording heads R1 and R2 are arranged in positions shifted by 180°, FIG. 18 shows an arrangement of a rotary transformer portion of one channel according to the above first embodiment in which two reproduction heads P1 and P2 are arranged in positions shifted by 180°, and FIG. 19 shows a rotary transformer portion of one channel according to the above second embodiment in which a recording head R and a reproduction head P are arranged in positions shifted by 180°. As is apparent from FIGS. 17, 18, and 19, the length of wiring must be increased.

As described above, when circuits arranged in different directions with respect to a rotation angular direction of a rotary member of a rotary transformer are to be sequentially, selectively switched to an enable state, the positions in rotation angular directions of the circuits differ from the position in the rotation angular direction of the lead wires of the rotary member of the rotary transformer by a maximum of 180°. Therefore, a circuit having a larger difference from the position in the rotary angular direction of the lead wires of the rotary member of the rotary transformer requires a longer cable for coupling with respect to the driver or receiver circuit, thereby increasing a coupling capacitance between the driver or receiver circuit and the rotary transformer to degrade transmission characteristics. As a result, a difference may be produced between characteristics of the n recording or reproduction circuits or recording and reproduction circuits.

In an arrangement in which recording or reproduction circuits or circuits for performing both recording and reproduction arranged in different directions with respect to a rotation angular direction of a rotary member of a rotary transformer are sequentially, selectively switched to an enable state, thereby reducing the number of channels of the rotary transformer, therefore, a rotary transformer apparatus can be arranged as follows in order to minimize a coupling capacitance between a driver or receiver circuit and the rotary transformer and to minimize a difference between characteristics of the recording or reproduction circuits or recording and reproduction circuits.

That is, by arranging a plurality of windings in a single winding slot of a rotary member, a stationary member, or both the rotary and stationary members, a lead position of lead wires of each of a plurality of windings arranged in a single slot can be arranged to coincide with the position of a corresponding recording or reproduction circuit or recording and reproduction circuit in the rotation angular direction of the rotary transformer. In addition, a circuit for setting a high impedance in an output stage of each of n reproduction circuits commonly connected in parallel with the above rotary transformer in a disable state may be provided to prevent the reproduction circuit in a disable state from adversely affecting another circuit.

Figure 20:
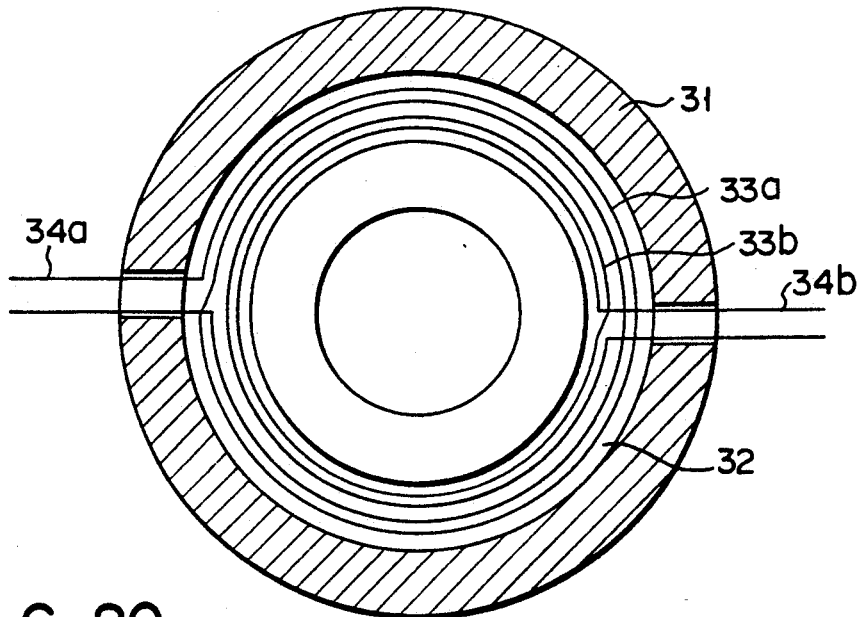
FIG. 20 is a schematic plan view for explaining an arrangement of a rotary member or a stationary member of a rotary transformer unit for use in the third, fourth, and fifth embodiments of the present invention.

FIG. 20 is a plan view showing a rotary member of a rotary transformer apparatus according to the third to fifth embodiments of the present invention. An arrangement in which an effective recording area angle is 180° will be described. Two windings 33a and 33b are wound around a winding slot 32 annularly formed in a ferrite core 31. Lead wires 34a and 34b of the two windings 33a and 33b, respectively, are led at positions having entirely different rotation angular directions (positions shifted by 180° in FIG. 20) of a rotary transformer.

Figure 21:
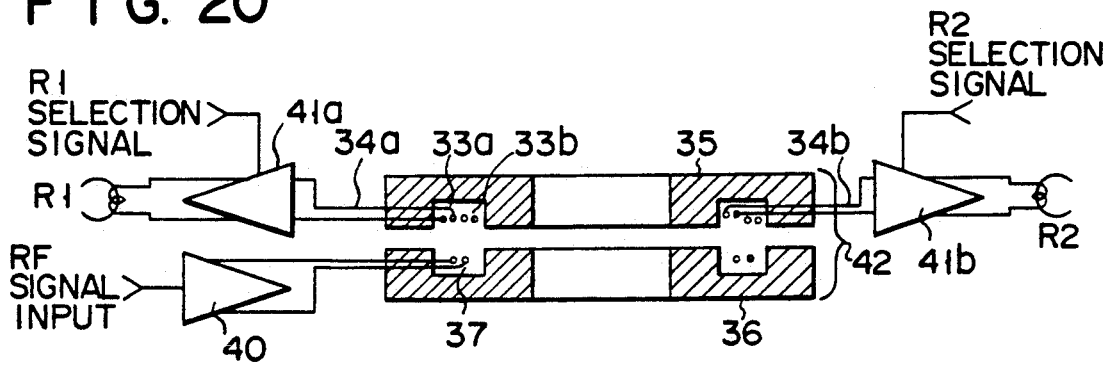
FIG. 21 is a schematic view for explaining an arrangement of a main part of the third embodiment of the present invention using, for recording, a rotary transformer unit having a rotary member as shown in FIG. 20 and a stationary member in which a winding is wound in a winding slot.

FIG. 21 shows an arrangement in which a rotary transformer apparatus 42 of the third embodiment of the present invention comprising a rotary member (rotor) 35 having the arrangement shown in FIG. 20 and a stationary member (stator) 36 in which a single winding is wound in a winding slot is used for recording. An information signal (RF signal) to be recorded in a magnetic tape is amplified by a rotary transformer driving circuit 40 and transmitted into a rotary drum via the rotary transformer apparatus 42. Two magnetic heads R1 and R2 are arranged at positions shifted by 180°. Recording circuits 41a and 41b connected to the two magnetic heads R1 and R2, respectively, are arranged at positions in the rotary drum shifted by 180° so as to minimize a cable length to obtain a minimum connection capacitance. Note that the RF signal to be input to the rotary transformer driving circuit 40 includes both information signals to be recorded by the magnetic heads R1 and R2 and these signals must be transmitted to the heads R1 and R2 with minimum degradation in characteristics. One recording circuit 41a, therefore, is connected to the lead wires 34a from the first winding wound in the winding slot of the rotary member 35, and the other recording circuit 41b is connected to the lead wires 34b from the second winding wound in the winding slot of the rotary member 35. A winding 37 provided in a slot formed in the stationary member 36 is positioned at substantially the central portion between the two windings 33a and 33b provided in the rotary member 35 opposing the stationary member 36. With this arrangement, since the lead wires 34a and 34b are arranged in the rotary drum to oppose each other with an angle of 180° therebetween, connection distances from the recording circuits 41a and 41b to the windings 33a and 33b, respectively, can be minimized. Therefore, a coupling capacitance between the circuits and the rotary transformer and a difference between the two recording circuits can be minimized.

The recording circuits 41a and 41b are sequentially switched between enable and disable states upon each 180° rotation by R1 and R2 selection signals, respectively. When the recording circuit is in the enable state, the magnetic head R1 or R2 is driven to record an RF signal in a magnetic tape (not shown).

In this arrangement, signal transmission is alternately performed between the windings 37 and 33a and between the windings 37 and 33b each time the rotary drum rotates through 180°. If, however, an input impedance of the recording circuit 41b is low while a signal is transmitted between the windings 37 and 33a or an input impedance of the recording circuit 41a is low while a signal is transmitted between the windings 37 and 33b, transmission characteristics are degraded. The input impedance of the recording circuit 41b, therefore, must be high while a signal is transmitted between the windings 37 and 33a, and the input impedance of the recording circuit 41a must be high while a signal is transmitted between the windings 37 and 33b. For this purpose, an emitter follower or a Darlington emitter follower is used as a circuit at an input stage of each of the recording circuits 41a and 41b so as not to cause degradation in transmission characteristics, thereby increasing the input impedance.

Figure 22:
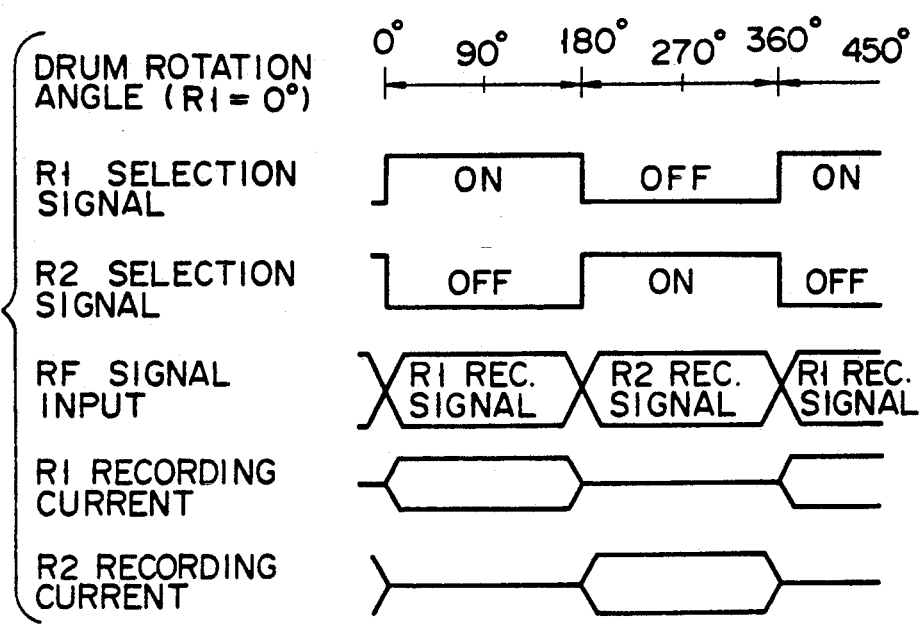
FIG. 22 is a timing chart showing a series of sequences of an operation associated with switching of a recording circuit according to the embodiment shown in FIG. 21.

FIG. 22 shows a series of time sequences of a switching operation of the recording circuits.

The recording circuits 41a and 41b are sequentially switched between enable and disable states upon each 180° rotation by the R1 and R2 selection signals, respectively. When the recording circuits 41a and 41b are in an enable state, input RF signals drive the magnetic heads R1 and R2 to supply R1 and R2 recording currents to the magnetic heads, respectively. As a result, the RF signals corresponding to the currents are recorded in a magnetic tape.

FIG. 23 shows the fourth embodiment of the present invention in which a rotary transformer apparatus 42 comprising a rotary member 35 having the arrangement as shown in FIG. 20 and a stationary member 36 in which a single winding is wound in a winding slot is used for reproduction.

RF signals reproduced from a magnetic tape by magnetic heads P1 and P2 are amplified by reproduction circuits 43a and 43b, respectively. The rotary transformer apparatus 42 is driven by outputs from the reproduction circuits 43a and 43b to transmit the reproduced RF signals outside a rotary drum. As is apparent from a series of time sequences of a switching operation of the reproduction circuits shown in FIG. 24, the reproduction circuits 43a and 43b are sequentially switched between enable and disable states upon each 180° rotation by P1 and P2 selection signals, respectively. When the reproduction circuit is in an enable state, an RF signal obtained from a P1 or P2 reproduced signal reproduced from the magnetic head P1 or P2, respectively, is transmitted outside the rotary drum. The reproduced RF signal is received by a rotary transformer receiving circuit 44 and transmitted to a circuit at a subsequent stage.

In this arrangement, the two magnetic heads P1 and P2 are arranged in positions shifted by 180°. In order to minimize a cable length to obtain a minimum connection capacitance, the two reproduction circuits 43a and 43b connected to the magnetic heads P1 and P2, respectively, are arranged in the rotary drum to oppose each other with an angle of 180° therebetween. An RF signal to be input to the rotary transformer receiving circuit 44 must include both information signals to be reproduced by the magnetic heads P1 and P2, and these signals must be transmitted from the heads P1 and P2 with minimum degradation in characteristics. One reproduction circuit 43a, therefore, is connected to lead wires 34a of a first winding 33a wound in a winding slot of the rotary member 35, and the other reproduction circuit 43b is connected to lead wires 34b of a second winding 33b wound in a winding slot of the rotary member 35. With this arrangement, since the lead wires 34a and 34b are arranged at positions in the rotary drum shifted by 180°, connection distances from the reproduction circuits 43a and 43b to the windings 33a and 33b of the rotary transformer, respectively, can be minimized. Therefore, a coupling capacitance between the circuits and the rotary transformer and a difference between the two circuits can be minimized. The reproduction circuits 43a and 43b are sequentially switched between enable and disable states upon each 180° rotation by P1 and P2 selection signals, respectively. A reproduction circuit in an enable state drives the magnetic head P1 or P2 to reproduce an RF signal from the magnetic head.

Outputs from the reproduction circuits 43a and 43b are connected to the same rotary transformer apparatus 42. Therefore, in order to prevent degradation in frequency characteristics in a reproduction circuit in an enable state, an output from a reproduction circuit in a disable state is set in a high-impedance state. For this purpose, a circuit similar to that shown in FIG. 5 is used to increase the impedance of an output from the reproduction circuit. Note that although only one output side is shown in FIG. 5, outputs from the reproduction circuits are parallel outputs.

FIG. 25 shows the fifth embodiment of the present invention in which a rotary transformer apparatus 42 comprising a rotary member 35 having the arrangement as shown in FIG. 20 and a stationary member 36 in which a single winding is wound in a winding slot is used for both recording and reproduction. In this embodiment, recording and reproduction are alternately performed each time the rotary drum rotates through 180°.

A recording circuit 45 amplifies an information signal from the rotary transformer apparatus 42 and supplies the amplified signal to a magnetic head R, thereby driving the head R. A magnetic head P is arranged in a position shifted by 180° from the magnetic head R. The information signal is reproduced from a magnetic tape by the magnetic head P, amplified by a reproduction circuit 46, and transmitted outside the rotary drum by the rotary transformer apparatus 42 connected to the output side of the reproduction circuit 46. An information signal (RF signal) to be recorded in the magnetic tap is amplified by a rotary transformer driving circuit 47 and transmitted into the rotary drum by the rotary transformer apparatus 42. As is apparent from a series of time sequences of a switching operation of the recording and reproduction circuits shown in FIG. 26, the recording circuit 45 is sequentially switched between enable and disable states upon each 180° rotation by an R selection signal. When the recording circuit is in an enable state, it drives the magnetic head R by an R recording current to record the RF signal in the magnetic tape.

Reproduction of an RF signal from a magnetic tape will be described below. An RF signal reproduced from a magnetic tape by the magnetic head P is amplified by the reproduction circuit 46 to drive the rotary transformer apparatus 42. The rotary transformer apparatus 42 transmits the RF signal outside the rotary drum. As is apparent from a series of time sequences of the switching operation of the recording and reproduction circuits shown in FIG. 26, the reproduction circuit 46 is sequentially switched between enable and disable states upon each 180° rotation by a P selection signal. When the reproduction circuit is in an enable state, it transmits a reproduced output as an RF signal reproduced by the magnetic head P to outside the rotary drum. The reproduced RF signal transmitted from the apparatus 42 is received by a rotary transformer receiving circuit 48 and transmitted to a circuit at a subsequent stage.

In this arrangement, the two magnetic heads R and P are arranged in positions shifted by 180°. In order to minimize a cable length to obtain a minimum connection capacitance, the recording and reproduction circuits 45 and 46 connected to the two magnetic heads are arranged in the rotary drum at positions shifted by 180°. These signals must be transmitted from an RF signal input to the magnetic head R upon recording and from the magnetic head P to an RF signal output upon reproduction with minimum degradation in characteristics. The recording circuit 45, therefore, is connected to lead wires 34b of a second winding 33b wound in a winding slot of the rotary member 35, and the reproduction circuit 46 is connected to lead wires 34a of a first winding 33a wound in a winding slot of the rotary member 35. With this arrangement, since the lead wires 34a and 34b are arranged at positions in the rotary drum shifted by 180°, a connection distance from the recording circuit 45 to the winding 33b of the rotary transformer and that from the reproduction circuit 46 to the winding 33a of the rotary transformer can be minimized. As a result, a coupling capacitance between the circuits and the rotary transformer can be minimized to achieve minimum degradation in characteristics.

In this arrangement, the recording and reproduction circuits 45 and 46 are connected to the same rotary transformer apparatus 42. In order to prevent degradation in frequency characteristics of a circuit in an enable state, therefore, an input of the recording circuit in a disable state and an output of the reproduction circuit in a disable state are set in a highimpedance state. A method of obtaining a high impedance is the same as that of the above two embodiments.

In each of the above third to fifth embodiments, an arrangement in which the above technique is applied to only a rotary member has been described by taking a flat type one-channel rotary transformer apparatus as an example. The above technique, however, can be applied to a stationary member. In addition, the above technique can be applied also to a coaxial type rotary transformer apparatus. Furthermore, the above technique can be applied regardless of the number of channels or the number of turns of a winding of a rotary transformer apparatus.

In a rotary transformer apparatus as described above, transmission characteristics may be changed due to rotation of a rotary drum, i.e., rotation of a rotary transformer. Such a change in transmission characteristics significantly appears when the number of turns of a winding is small and is most conspicuous when a winding has only one turn. Since the number of turns of a winding must be reduced as the frequency of a transmission signal is increased, the number of turns is reduced as the band and transmission rate of a VTR using the rotary transformer are widened and increased, respectively.

Figure 27:
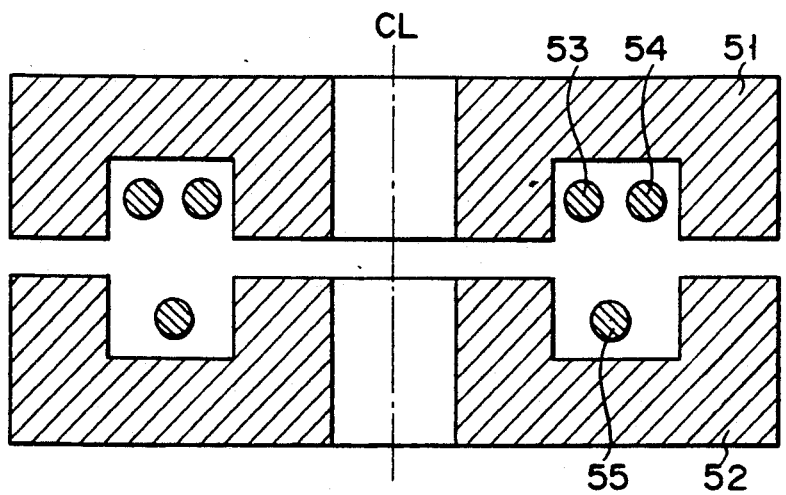
FIGS. 27 and 28 are sectional views for explaining problems of a rotary transformer apparatus for performing signal transmission between a rotary member and a stationary member in which a plurality of windings are wound in a single slot of one member while a single winding is wound in a slot of the other member.
Figure 28:
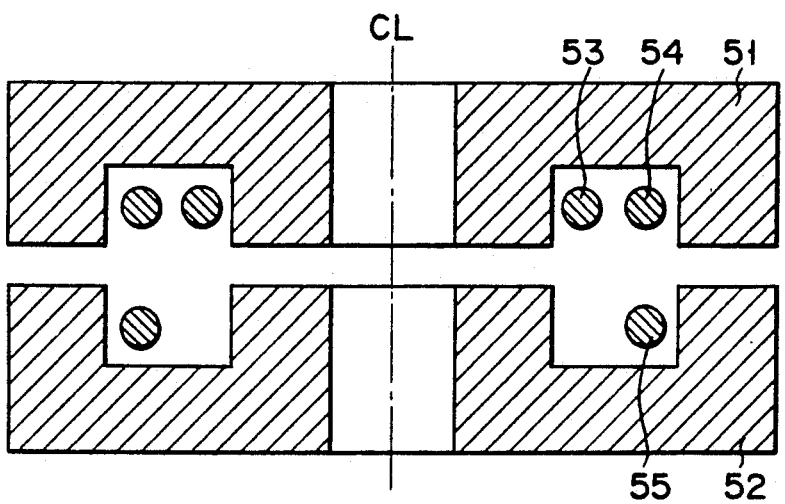

For example, an arrangement in which windings 53 and 54 each having one turn are wound in a winding slot of one member (one of stationary and rotary members) 51 of a rotary transformer and a winding 55 having one turn is wound in a winding slot of the other member 52 as shown in FIGS. 27 and 28 will be described below.

Referring to FIG. 27, the one-turn winding 55 of the member 52 is wound in a central portion of the winding slot. With this arrangement, it is assumed that transmission characteristics between the windings 53 and 54 wound around the member 51 and the winding 55 wound around the member 52 are substantially equal to each other provided that the members and the windings are ideally arranged. Actually, however, it is impossible to wind, e.g., the winding 55 in the central portion of the winding slot throughout 360°. Upon rotation, therefore, transmission characteristics between the windings 53 and 55 or windings 54 and 55 are changed.

As shown in FIG. 28, the one-turn winding 55 of the member 52 may be shifted to one side of the winding slot. In this case, a change in transmission characteristics caused upon rotation between the opposing windings 54 and 55 can be reduced to a negligible level. A change in transmission characteristics between the windings 53 and 55 which do not oppose each other, however, is caused more easily than when the winding 55 is wound in the central portion of the winding slot. In addition, a large difference is produced between the transmission characteristics between the windings 53 and 55 and those between the windings 54 and 55. When the rotary transformer is used, the windings 53 and 54 are selectively used. It is, therefore, not preferred that a difference is produced between the transmission characteristics between the windings 53 and 55 and those between the windings 54 and 55.

As described above, in a rotary transformer apparatus for transmitting signals between rotary and stationary members, in which a plurality of windings are arranged in a single slot of the rotary member and a single winding is arranged in a slot of the stationary member or a plurality of windings are arranged in a single slot of the stationary member and a single winding is arranged in a slot of the rotary member, transmission characteristics between a plurality of transmission paths are preferably, constantly uniform.

In the embodiments of the present invention, therefore, the thickness or width of a winding of a member in which a single winding is arranged is increased to be larger than that of each of a plurality of windings of a member in which a plurality of windings are arranged, thereby obtaining constantly uniform transmission characteristics between a plurality of transmission paths. As described above, this method is most effective when a winding has only one turn. In each of the following embodiments, therefore, an arrangement in which two one-turn windings are wound around one member and single one-turn winding is wound around the other member will be described.

Figure 29:
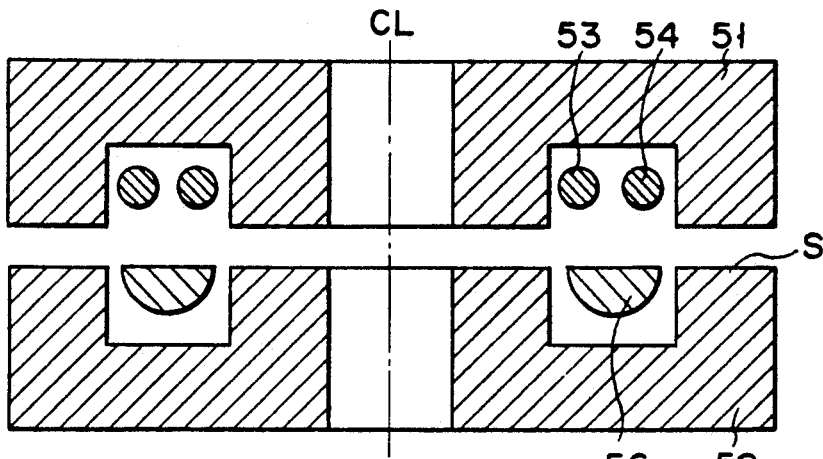
FIG. 29 is a sectional view schematically showing an arrangement of the sixth embodiment of the present invention for solving problems of a rotary transformer apparatus for performing signal transmission between a rotary member and a stationary member in which a plurality of windings are wound in a single slot of one member while a single winding is wound in a slot of the other member.

FIG. 29 schematically shows a rotary transformer apparatus used in the sixth embodiment of the present invention.

In this embodiment, a winding 56 of a member 52 is constituted by a wire thicker than that of windings 53 and 54 of a member 51 and wound in a winding slot of the member 52 so that a portion corresponding to ½ of a wire diameter projects from the slot. When an opposing surface S of the member 52 with respect to the member 51 is polished, the winding 56 is simultaneously polished to obtain a semicircular section. Since the polished surface of the winding 56 uniformly opposes the windings 53 and 54, no difference is produced between transmission characteristics between the windings 53 and 56 and those between the windings 54 and 56, and a change in transmission characteristics caused upon rotation can be suppressed.

FIG. 30 schematically shows a rotary transformer apparatus used in the seventh embodiment of the present invention.

In this embodiment, since a winding 57 of a member 52 is constituted by a metal foil such as a copper foil, no difference is produced between transmission characteristics between windings 53 and 57 and those between windings 54 and 57, and a change in transmission characteristics caused upon rotation can be suppressed. In this arrangement, the metal foil is fixed on a member by an adhesive or the like.

FIG. 31 schematically shows a rotary transformer apparatus used in the eighth embodiment of the present invention.

In this embodiment, since a winding 58 of a member 52 is constituted by a metal plate, no difference is produced between transmission characteristics between windings 53 and 58 and those between windings 54 and 58, and a change in transmission characteristics caused upon rotation can be suppressed. In this arrangement, the metal plate is formed to have a shape corresponding to the shape of a winding slot and then fitted in the slot. If, however, the member 52 consists of a conductor, a problem may be posed in characteristics unless the member 52 and the winding 58 are electrically insulated from each other.

FIG. 32 schematically shows a rotary transformer apparatus used in the ninth embodiment of the present invention which solves the above problem of insulation.

In this embodiment, since a winding 59 of a member 52 is constituted by a printed wiring board composed of an insulating plate 59A and a conductor foil 59B, no difference is produced between transmission characteristics between windings 53 and 59 and those between windings 54 and 59, and a change in transmission characteristics caused upon rotation can be suppressed. In this arrangement, although not shown in FIG. 32, two side portions of the conductor foil 59B are not in direct contact with the inner walls of a winding slot of the member 52, thereby electrically insulating the member 52 and the winding 59 from each other.

FIG. 33 schematically shows a rotary transformer apparatus used in the tenth embodiment of the present invention.

In this embodiment, since a winding 60 of a member 52 is formed by deposition of a conductive metal, no difference is produced between transmission characteristics between windings 53 and 60 and those between windings 54 and 60, and a change in transmission characteristics caused upon rotation. In this arrangement, in order to electrically insulate the member 52 and the winding 60 from each other, an insulating material is preferably deposited before deposition of the metal. Alternatively, the winding 60 can be formed not by deposition but by, e.g., sputtering.

FIG. 34 schematically shows a rotary transformer apparatus used in the 11th embodiment of the present invention. FIG. 35 is a top view of a member 52 shown in FIG. 34.

In this embodiment, since a winding 61 of a member 52 is constituted by two windings 62 and 63 connected in parallel with each other to electrically form one turn, no difference is produced between transmission characteristics between windings 53 and 61 and those between windings 54 and 61, and a change in transmission characteristics caused upon rotation can be suppressed. The windings 62 and 63 are connected with each other at a lead port 64 and connected to external circuits via lead wires 65 and 66, respectively, of the rotary transformer.

In each of the above embodiments, the present invention has been described by taking a flat type one-channel rotary transformer as an example. The present invention, however, can be applied to a coaxial type rotary transformer apparatus. In addition, the present invention can be applied regardless of the number of channels of a rotary transformer apparatus.

In addition, in a rotary transformer apparatus for transmitting signals between a rotary member having a plurality of windings wound in a single slot and a stationary member having a single winding wound in a slot or between a stationary member having a plurality of windings wound in a single slot and a rotary member having a single winding wound in a slot, uniformity of transmission characteristics can be increased by setting a winding slot width of a member having a single winding to be different from that of a member having a plurality of windings.

For example, the width of a winding slot of a member having a single winding is set to be larger than that of a member having a plurality of slots so that a thicker (larger diameter) or wider winding can be wound. As a result, since a single winding and a plurality of windings oppose each other more easily, uniformity of transmission characteristics of a plurality of transmission paths can be improved.

With this arrangement, a core width of a member having a wider winding slot width can be made smaller than that of a member having a narrower winding slot width. Therefore, since a core opposing width is defined by the core width of the member having a wider winding slot width, an influence of variation caused by rotation can be reduced.

FIGS. 36 to 47 show arrangements of rotary transformer apparatuses according to the 12th to 23rd embodiments of the present invention obtained by adopting the above technique to the embodiments shown in FIGS. 29 to 34, respectively.

In these embodiments, similar to the embodiments shown in FIGS. 29 to 34, the effect of the present invention is remarkable when a winding is wound by one turn. In each of the following embodiments, therefore, an arrangement in which two one-turn windings are wound in one member and one one-turn winding is wound in the other member will be described.

Figure 36:
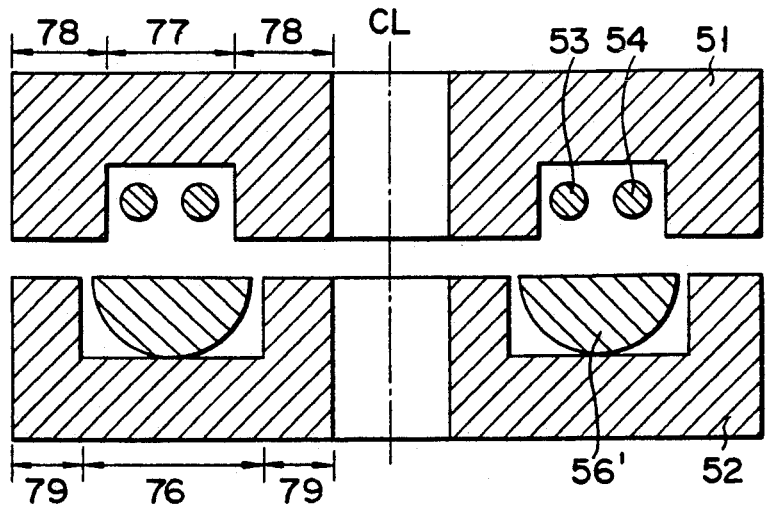
FIG. 36 is a sectional view schematically showing an arrangement of the 12th embodiment of the present invention.
Figure 37:
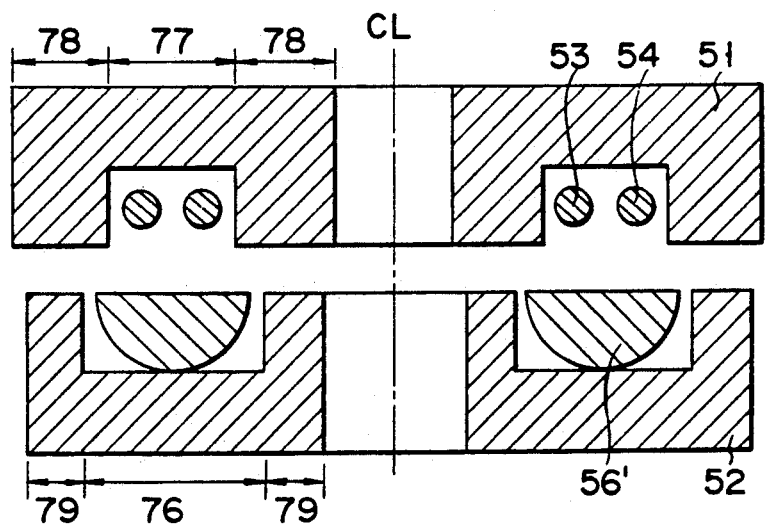
FIG. 37 is a sectional view schematically showing an arrangement of the 13th embodiment of the present invention.

FIGS. 36 and 37 schematically show rotary transformer apparatuses according to the 12th and 13th embodiments of the present invention, respectively.

These embodiments differ from the embodiment show in FIG. 29 in that a winding slot width 76 of a member 52 is made wider than a winding slot width 77 of a member 51. With this arrangement, a winding 56' of the member 52 can be made thicker than the winding 56 shown in FIG. 29 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 36, the outer diameter of the member 52 can be made smaller than that of the member 51 as shown in FIG. 37. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Figure 38:
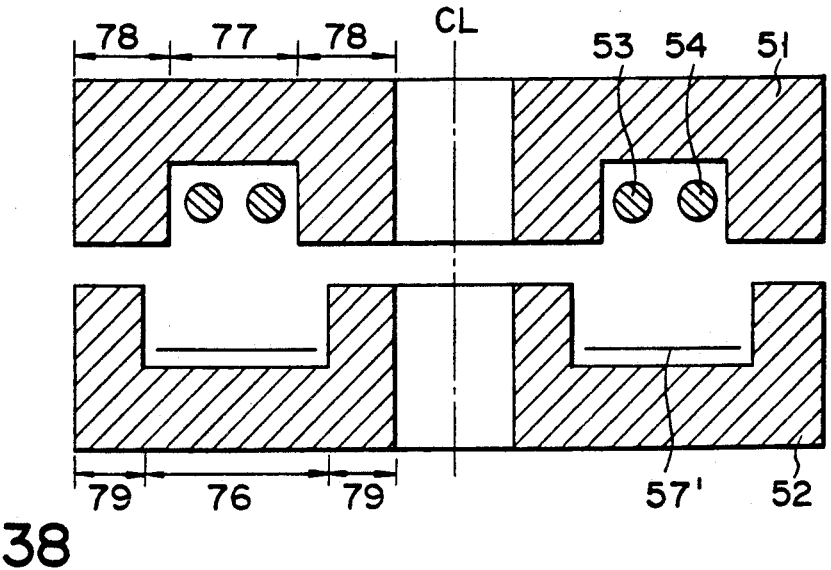
FIG. 38 is a sectional view schematically showing an arrangement of the 14th embodiment of the present invention.
Figure 39:
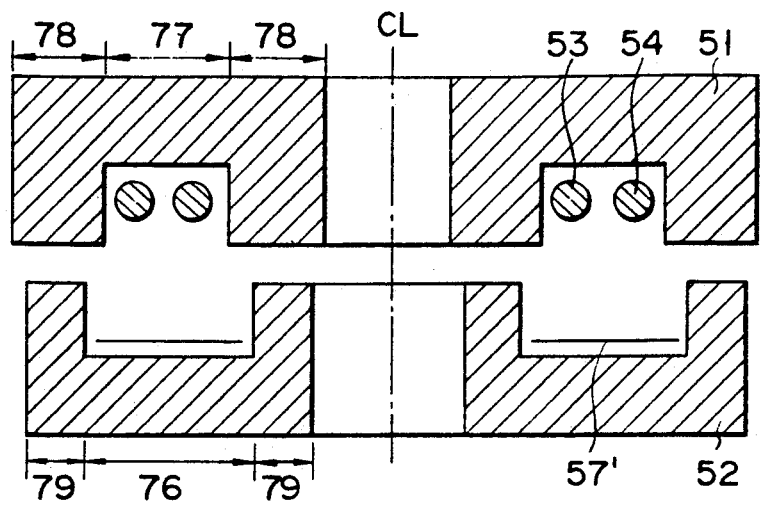
FIG. 39 is a sectional view schematically showing an arrangement of the 15th embodiment of the present invention.

FIGS. 38 and 39 schematically show rotary transformer apparatuses according to the 14th and 15th embodiments of the present invention, respectively.

These embodiments differ from the embodiment shown in FIG. 30 in that a winding slot width 76 of a member 52 is made wider than a winding slot width 77 of a member 51. With this arrangement, a thin film 57' used as a winding of the member 52 can be made wider than the thin film 57 shown in FIG. 30 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed i FIG. 38, the outer diameter of the member 52 can be made smaller than that of the member 51 as shown in FIG. 39. In this case, since the core opposing area is defined by core width of member 52×(core outer diameter of member 52+core inner diameter of member 52)/2 a variation caused by rotation can be further reduced. As a result, a change in transmission characteristics caused by rotation can be suppressed.

Figure 40:
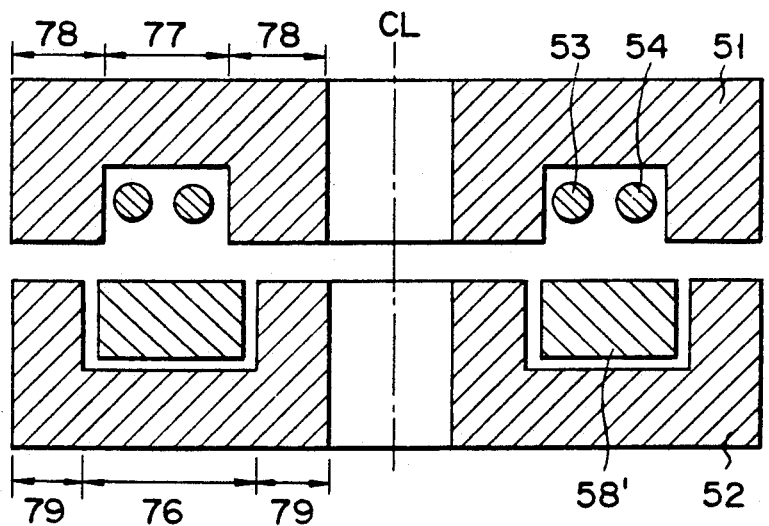
FIG. 40 is a sectional view schematically showing an arrangement of the 16th embodiment of the present invention.
Figure 41:
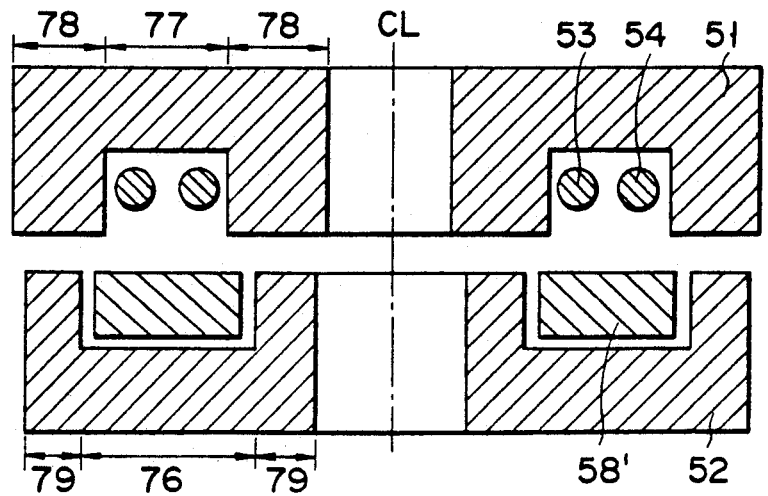
FIG. 41 is a sectional view schematically showing an arrangement of the 17th embodiment of the present invention.

FIGS. 40 and 41 schematically show rotary transformer apparatuses according to the 16th and 17th embodiments of the present invention, respectively.

These embodiments differ from the embodiment shown in FIG. 31 in that a winding slot width 76 of a member 52 is made wider than a winding slot width 77 of a member 51. With this arrangement, a metal plate 58' used as a winding of the member 52 can be made wider than the metal plate 58 shown in FIG. 31 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 40, the outer diameter of the member 52 can be made smaller than that of the member 51 as shown in FIG. 41. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

FIGS. 42 and 43 schematically show rotary transformer apparatuses according to the 18th and 19th embodiments of the present invention, respectively.

These embodiments differ from the embodiment shown in FIG. 32 in that a winding slot width 76 of a member 52 is made wider than a winding slot width 77 of a member 51. With this arrangement, a printed wiring board 59' used as a winding of the member 52 can be made wider than the printed wiring board 59 shown in FIG. 32 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 42, the outer diameter of the member 52 can be made smaller than that of the member 51 as shown in FIG. 43. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Figure 45:
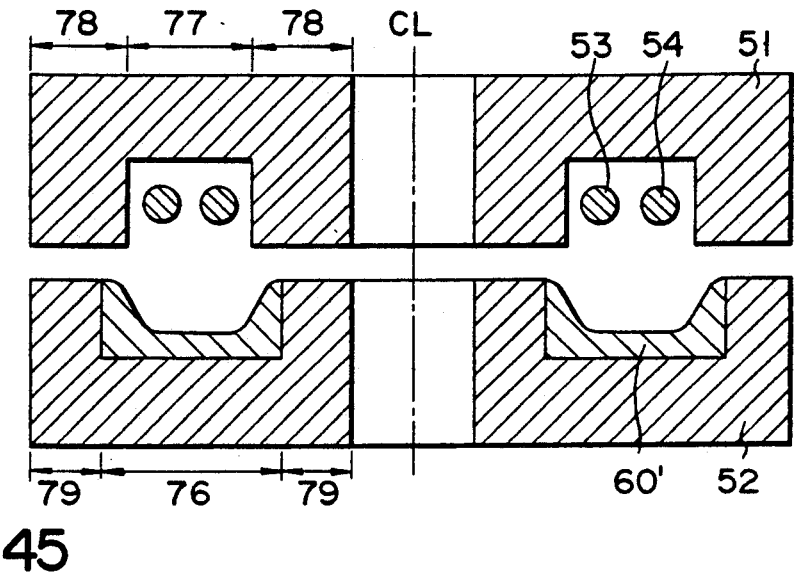
FIG. 45 is a sectional view schematically showing an arrangement of the 21st embodiment of the present invention.

FIGS. 44 and 45 schematically show rotary transformer apparatuses according to the 20th and 21st embodiments of the present invention, respectively.

These embodiments differ from the embodiment shown in FIG. 33 in that a winding slot width 76 of a member 52 is made wider than a winding slot width 77 of a member 51. With this arrangement, a deposited or sputtered film 60' used as a winding of the member 52 can be made wider than the deposited or sputtered film 60 shown in FIG. 33 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 44, the outer diameter of the member 52 can be made smaller than that of the member 51 as shown in FIG. 45. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Figure 46:
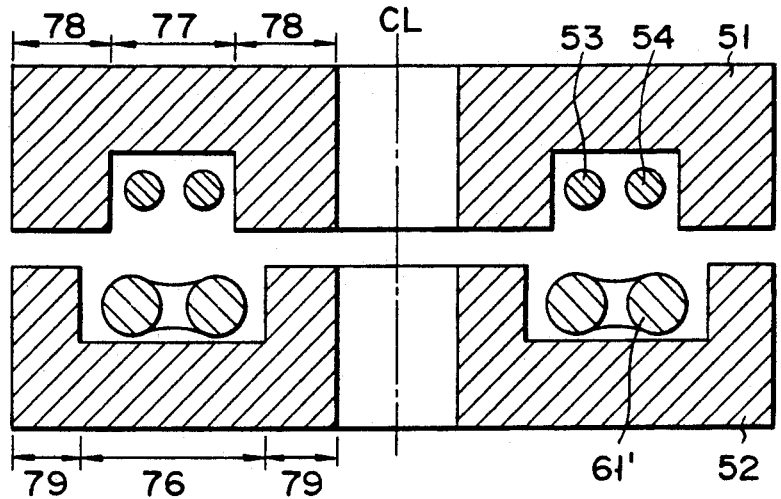
FIG. 46 is a sectional view schematically showing an arrangement of the 22nd embodiment of the present invention.
Figure 47:
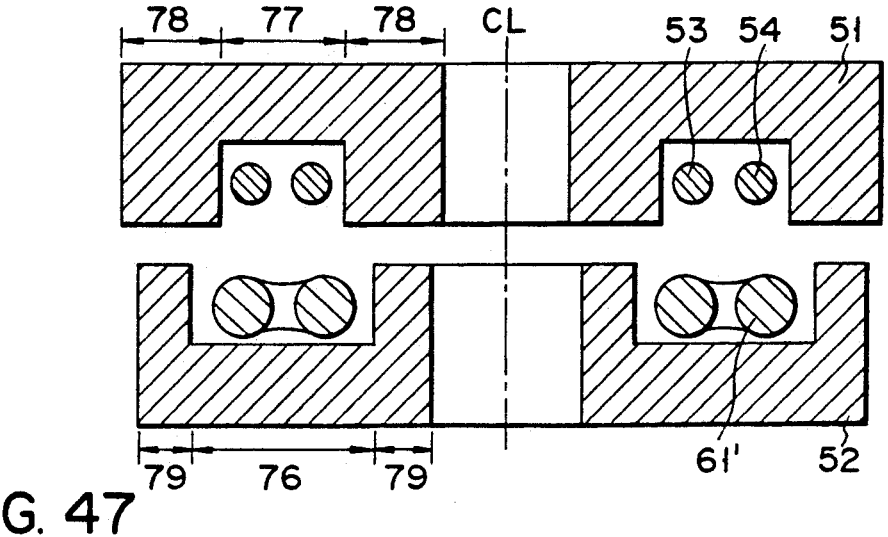
FIG. 47 is a sectional view schematically showing an arrangement of the 23rd embodiment of the present invention.

FIGS. 46 and 47 schematically show rotary transformer apparatuses according to the 22nd and 23rd embodiments of the present invention, respectively.

These embodiments differ from the embodiment shown in FIG. 34 in that a winding slot width 76 of a member 52 is made wider than a winding slot width 77 of a member 51. With this arrangement, a (double) winding 61' used as a winding of the member 52 can be made wider than the (double) winding 61 shown in FIG. 34 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 46, the outer diameter of the member 52 can be made smaller than that of the member 51 as shown in FIG. 47. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic recording and reproduction apparatus comprising:
   a scanner including a rotary drum having a circumferential surface, and a stationary drum opposing said rotary drum;
   mechanical driving means for driving said rotary drum to rotate and causing a magnetic tape as a recording medium to travel in contact with at least a part of the circumferential surface of said rotary drum;
   first magnetic head means having at least first and second recording magnetic heads used for recording an information signal, said first and second recording magnetic heads being installed on said rotary drum so that they rotate together therewith, and are into contact with said magnetic tape;
   a plurality of recording circuit means connected directly to said first and second recording magnetic heads, respectively, and installed on said rotary drum so that they rotate together therewith, said recording means being selectively active and inactive,
   a first rotary transformer unit having a rotary member mounted on said rotary drum and a stationary member, said rotary and stationary members each having at least one core with a circular slot, at least one primary coil being inserted in the circular slot of the core of said stationary member, at least first and second secondary coils being inserted in the circular slot of the core of said rotary member, and said first secondary coil being coupled directly to an input terminal of said first recording circuit and said second secondary coil being coupled directly to an input terminal of said second recording circuit, and said first and second secondary coils being wound around an axis of rotation of said rotary drum;

first selective control means comprising detection means for detecting the rotational positions of said rotary drum which correspond to an effective recording area of said magnetic tape, said detection means including a plurality of photodetectors installed respectively at the positions corresponding to said magnetic heads on said rotary drum, and a plurality of light emitting elements densely arranged in an arcuated pattern on said stationary drum, each of said light emitting diodes being within a range corresponding to the effective recording area and corresponding in position to said photodetectors;

first control means coupled directly to said first and second recording circuits, for selectively controlling said recording circuits to active one of said recording circuits when the remaining ones of said recording circuits are inactive;

second magnetic head means having at least first and second reproduction magnetic heads used for reproducing an information signal recording in the magnetic tape, said first and second reproduction magnetic heads being installed on said rotary drum so that they rotate together therewith, and are in contact with the magnetic tape;

a plurality of reproduction circuit means connected directly to said first and second reproduction magnetic heads, respectively, and installed on said rotary drum so that they rotate together therewith, said reproduction circuit means being selectively active and inactive;

a second rotary transformer unit having a rotary member mounted on said rotary drum and a stationary member, said rotary and stationary members each having at least one core with a circuit slot, and at least first and second primary coils being inserted in the slot of the core of said rotary member and at least one secondary coil being inserted in the slot of the core of said stationary member, and said first Primary coil being coupled directly to an output terminal of said first reproduction circuit and said second primary coil being coupled directly to an output terminal of said second reproduction circuit, and said first and second primary coils being wound around an axis of rotation of said rotary drum;

second selective control means comprising detection means for detecting the rotational positions of said rotary drum which correspond to an area of said magnetic tape to be reproduced, said detection means including a Plurality of photodetectors installed respectively at the positions corresponding to said magnetic heads on said rotary drum, and a plurality of light emitting elements densely arranged in an arcuated pattern on said stationary drum, each of said light emitting diodes being within a range corresponding to the area to be reproduced and corresponding in position to said photodetectors:

second control means coupled directly to said first and second reproduction circuits, for selectively controlling said reproduction circuits to active one of said reproduction circuits when the remaining ones of said reproduction circuits are inactive; and signal processing means for performing at least one of recording and reproduction of information on said magnetic tape via said plurality of magnetic heads, said plurality of amplifying circuits, and said rotary transformer.

2. An apparatus according to claim 1, wherein said mechanical driving means includes means for winding said magnetic tape on the circumferential surface of said rotary drum so that an effective wrap angle which smaller than a total wrap angle becomes not more than 180', said effective wrap angle being an angle which covers an effective area of the magnetic tape on which an information signal can be recorded or reproduced and said total wrap angle being an angle at which the magnetic tape is wound around said rotary drum; and each of said recording circuits is activated in the effective wrap angle, for amplifying an information signal to be recorded, and each of said reproduction circuits is activated in the effective wrap angle, for amplifying an information signal to be reproduced.

3. An apparatus according to claim 2, wherein said selective control means includes an optical reflective portion provided on that portion of said stationary drum which corresponds to an effective recording area of said stationary drum, and a reflection type optical detecting element, mounted on said rotary drum at a position corresponding to each oaf said magnetic heads, for detecting said optical reflective portion and supplying a detection signal to said selective control means for selectively controlling said amplifying circuits.

4. An apparatus according to claim 2, wherein said selective control means includes a light-receiving element mounted on said rotary drum at a position which corresponds to each of said magnetic heads, and a light-emitting element provided at a portion corresponding to an effective recording area of said stationary drum and opposing said light-receiving element, said light-receiving element detecting light from said light-emitting element and supplying a detection signal to said selective control means for selectively controlling said amplifying circuits.

5. An apparatus according to claim 1 or 2, wherein said rotary transformer has at least first and second leading holes each holed at a position at which a wiring length between one of said first and second circuits and one of said first and second leading holes is shortest, and each of said first and second circuits is connected to one of said first and second coils of said rotary transformer through said first and second leading holes by first and second lead in wires, respectively.

6. An apparatus according to claim 1 or 2, wherein said recording or reproduction circuits include emitter followers or Darlington emitter followers are used as circuits of input stages of the recording or reproduction circuits.

7. An apparatus according to claim 1 or 2, wherein when one of said reproduction circuits is active, the remaining ones thereof have a higher output impedance than said one reproduction circuit.

8. An apparatus according to claim 2, wherein when two magnetic heads to be sequentially activated are mounted on said rotary drum, said total wrap angle is set at more than 180°.

9. An apparatus according to claim 2, wherein when three magnetic heads to be sequentially activated are mounted on said rotary drum, said total wrap angle is set at more than 120°.

10. An apparatus according to claim 2, wherein when four magnetic heads to be sequentially activated are mounted on said rotary drum, said total wrap angle is set at more than 90°.

11. An apparatus according to claim 1 or 2, wherein said recording and reproduction circuits each have an amplifier whose output stage or input stage has a balance output or input.

12. An apparatus according to claim 1 or 2, wherein said recording and reproduction circuits includes a constant current circuit for cutting off at least output stage of said recording and reproduction circuits when said recording and reproduction circuits are inactive.

13. An apparatus according to claim 1 or 2, wherein said rotary drum has a rotary transformer of more than 8 channels.

14. An apparatus according to claim 1 or 2, wherein each of said first and second coils of said rotary member of said rotary transformer is formed of a one-turn coil, and each of said first and second coils of said stationary member thereof is formed of a one-turn coil.

* * * * *